(12) United States Patent
Gonder et al.

(10) Patent No.: US 11,924,521 B2
(45) Date of Patent: *Mar. 5, 2024

(54) APPARATUS AND METHODS FOR DELIVERY OF MULTICAST AND UNICAST CONTENT IN A CONTENT DELIVERY NETWORK

(71) Applicant: Time Warner Cable Enterprises LLC, St. Louis, MO (US)

(72) Inventors: Tom Gonder, Broomfield, CO (US); William L. Helms, Longmont, CO (US); Kenneth Gould, Reston, VA (US); David Chen, Jamison, PA (US); John Chen, Ashburn, VA (US); Jian Yu, Ashburn, VA (US); Niem Dang, Sterling, VA (US); Vipul Patel, Great Falls, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/735,508

(22) Filed: Jan. 6, 2020

(65) Prior Publication Data

US 2020/0162797 A1 May 21, 2020

Related U.S. Application Data

(60) Division of application No. 15/219,083, filed on Jul. 25, 2016, now Pat. No. 10,531,161, which is a
(Continued)

(51) Int. Cl.
*H04N 21/647* (2011.01)
*H04L 65/611* (2022.01)
(Continued)

(52) U.S. Cl.
CPC ..... *H04N 21/64761* (2013.01); *H04L 65/611* (2022.05); *H04L 65/612* (2022.05);
(Continued)

(58) Field of Classification Search
CPC .......... H04N 21/6408; H04N 21/2225; H04N 21/2408; H04N 21/26616; H04N 21/6405;
(Continued)

(56) References Cited

U.S. PATENT DOCUMENTS 6,014,694 A 1/2000 Aharoni et al.
6,097,720 A 8/2000 Araujo et al.
(Continued)

OTHER PUBLICATIONS

American National Standards Institute/Society of Cable Telecommunications Engineers specification ANSI/STCE-35 2007, entitled "Digital Program Insertion Cueing Message for Cable" (pp. 1-41).
(Continued)

*Primary Examiner* — Oschta I Montoya
(74) *Attorney, Agent, or Firm* — Patent Beach PC

(57) ABSTRACT

Methods and apparatus for providing delivery of content to client devices of a network via both multicast and unicast mechanisms. In one embodiment, a system for use in a managed content delivery network is described to bridge multicast to unicast, so that the total network bandwidth consumption is significantly lower than a corresponding unicast-only delivery solution, yet which still provides improved quality of service and user viewing experience as compared to a multicast-only delivery solution. In addition, various exemplary aspects of the present disclosure are readily adapted for real-time multicast to unicast streaming of audio and data to, among other things, minimize network
(Continued)

bandwidth usage, while maintaining the guaranteed delivery of unicast streams with little or no modification to the existing client device logic.

20 Claims, 15 Drawing Sheets

Related U.S. Application Data continuation of application No. 13/843,322, filed on Mar. 15, 2013, now Pat. No. 9,402,107.

(51) Int. Cl.
| | |
|---|---|
| H04L 65/612 | (2022.01) |
| H04L 65/75 | (2022.01) |
| H04L 65/80 | (2022.01) |
| H04N 21/2225 | (2011.01) |
| H04N 21/24 | (2011.01) |
| H04N 21/266 | (2011.01) |
| H04N 21/6405 | (2011.01) |
| H04N 21/6408 | (2011.01) |
| H04N 21/643 | (2011.01) |

(52) U.S. Cl.
CPC ............ *H04L 65/765* (2022.05); *H04L 65/80* (2013.01); *H04N 21/2225* (2013.01); *H04N 21/2408* (2013.01); *H04N 21/26616* (2013.01); *H04N 21/6405* (2013.01); *H04N 21/6408* (2013.01); *H04N 21/64322* (2013.01)

(58) Field of Classification Search
CPC ........ H04N 21/64322; H04N 21/64761; H04L 65/605; H04L 65/4076; H04L 65/4084; H04L 65/80
See application file for complete search history.

(56) References Cited

U.S. PATENT DOCUMENTS

| | | | |
|---|---|---|---|
| 7,174,126 B2 | 2/2007 | McElhatten et al. | |
| 7,301,944 B1 | 11/2007 | Redmond | |
| 7,457,520 B2 | 11/2008 | Rosetti et al. | |
| 7,477,688 B1 | 1/2009 | Zhang et al. | |
| 7,602,820 B2 | 10/2009 | Helms et al. | |
| 8,627,390 B2 | 1/2014 | Benjamim et al. | |
| 8,656,042 B2 * | 2/2014 | Glasser | H04W 72/30 709/227 |
| 8,681,680 B2 | 3/2014 | Mao et al. | |
| 9,014,048 B2 | 4/2015 | Pantelias | |
| 9,066,153 B2 | 6/2015 | Pfeffer | |
| 9,215,423 B2 | 12/2015 | Kimble et al. | |
| 9,292,826 B1 | 3/2016 | Chen et al. | |
| 9,402,107 B2 | 7/2016 | Gonder et al. | |
| 2002/0023164 A1 | 2/2002 | Lahr | |
| 2002/0059442 A1 | 5/2002 | Van | |
| 2003/0056217 A1 | 3/2003 | Brooks | |
| 2004/0031056 A1 * | 2/2004 | Wolff | H04N 21/4622 725/110 |
| 2005/0034171 A1 | 2/2005 | Benya | |
| 2005/0089035 A1 | 4/2005 | Klemets et al. | |
| 2006/0123456 A1 | 6/2006 | Dei | |
| 2006/0130113 A1 | 6/2006 | Carlucci et al. | |
| 2008/0198848 A1 | 8/2008 | Yamagishi | |
| 2008/0313691 A1 | 12/2008 | Cholas et al. | |
| 2009/0132715 A1 | 5/2009 | Puthupparambil et al. | |
| 2009/0193485 A1 | 7/2009 | Rieger et al. | |
| 2009/0293095 A1 | 11/2009 | Karaoguz et al. | |
| 2010/0246582 A1 | 9/2010 | Salinger et al. | |
| 2010/0251305 A1 | 9/2010 | Kimble et al. | |
| 2011/0022689 A1 | 1/2011 | Piepenbrink et al. | |
| 2011/0035772 A1 * | 2/2011 | Ramsdell | H04N 21/23614 725/36 |
| 2011/0093900 A1 | 4/2011 | Patel et al. | |
| 2011/0103374 A1 | 5/2011 | Lajoie et al. | |
| 2011/0106961 A1 * | 5/2011 | Glasser | H04L 65/4076 709/231 |
| 2011/0173304 A1 | 7/2011 | Schlack et al. | |
| 2011/0219229 A1 | 9/2011 | Cholas et al. | |
| 2012/0023533 A1 * | 1/2012 | Wang | H04N 21/6405 725/109 |
| 2012/0023535 A1 | 1/2012 | Brooks | |
| 2012/0198506 A1 | 8/2012 | Joe et al. | |
| 2012/0254918 A1 * | 10/2012 | Takahashi | H04N 21/6543 725/40 |
| 2012/0314641 A1 | 12/2012 | Kotecha et al. | |
| 2012/0324358 A1 | 12/2012 | Jooste | |
| 2013/0024582 A1 * | 1/2013 | Rodrigues | H04W 72/30 709/231 |
| 2013/0046849 A1 | 2/2013 | Wolf et al. | |
| 2013/0067523 A1 * | 3/2013 | Kamitakahara | H04N 21/654 725/96 |
| 2013/0179590 A1 | 7/2013 | McCarthy et al. | |
| 2013/0312046 A1 | 11/2013 | Robertson et al. | |
| 2013/0322443 A1 * | 12/2013 | Dunbar | H04L 12/185 370/390 |
| 2015/0022626 A1 * | 1/2015 | Nahla | H04N 19/597 348/14.09 |
| 2015/0052570 A1 | 2/2015 | Lee et al. | |

OTHER PUBLICATIONS

CableLabs, "Data-Over-Cable Service Interface Specifications (DOCS!S): Converged Cable Access Platform: Converged Cable Access Platform Architecture Technical Report", CM-TR-CCAP-V03-12051, May 11, 2012 (pp. 1-44).

Digital Living Network Alliance (DLNA) Networked Device Interoperability Guidelines: Microsoft Extension: [MS-DLNHND]—v20130722; Jul. 22, 2013 (pp. 1-61).

"DOCSIS 3.0 Management Features Differences Technical Report" CM-TR-MGMT V3.0-DIFF-V01-071228.

"DOCSIS 3.0 OSSI Configuration Management Technical Report" CM-TR-OSSIv3.0-CM-VO1-080926.

Guidelines for Implementation: DASH264 Interoperability Points, DASH Industry Forum, Jan. 14, 2013.

Internet Engineering Task Force (IETF) Standard ISSN: 2070-1721 entitled "The WebSocket Protocol", Dec. 2011.

Motorola, White Paper CCAP 101: Guide to Understanding the Converged Cable Access Plafform, Feb. 2012 (pp. 1-7).

Sodagar, "the MPEG-DASH Standard for Multimedia Streaming over the Internet", IEEE Multimedia, IEEE Multimedia, Oct.-Dec. 2011 pp. 62-67.

\* cited by examiner

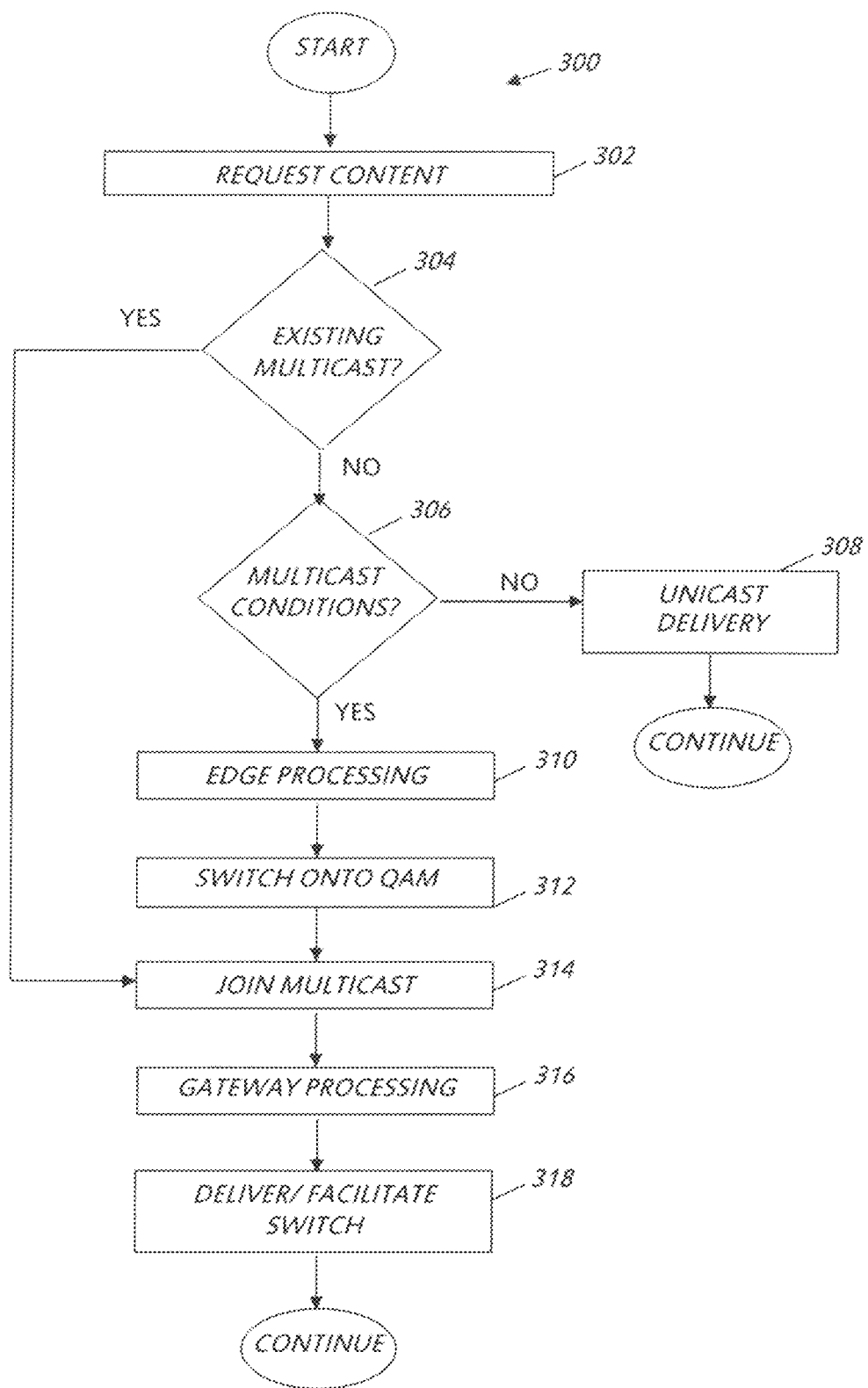

APPARATUS AND METHODS FOR DELIVERY OF MULTICAST AND UNICAST CONTENT IN A CONTENT DELIVERY NETWORK

PRIORITY AND RELATED APPLICATIONS

This application is a divisional of and claims priority to co-owned and U.S. patent application Ser. No. 15/219,083 of the same title filed Jul. 25, 2016, and issuing as U.S. Pat. No. 10,531,161 on Jan. 7, 2020, which is a continuation of and claims priority to co-owned U.S. patent application Ser. No. 13/843,322 of the same title filed Mar. 15, 2013, and issued as U.S. Pat. No. 9,402,107 on Jul. 26, 2016, each of which are incorporated herein by reference in its entirety. In addition, this application is related to co-owned and co-pending U.S. patent application Ser. No. 13/835,388 filed on Mar. 15, 2013 and entitled "APPARATUS AND METHODS FOR MULTICAST DELIVERY OF CONTENT IN A CONTENT DELIVERY NETWORK", and to U.S. patent application Ser. No. 13/333,444 filed on Dec. 21, 2011 and entitled "ADAPTIVE BIT RATES IN MULTICAST COMMUNICATIONS", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The disclosure relates generally to the field of networking and content delivery. In one exemplary aspect, the disclosure relates to the use of a network architecture for providing packetized content as a multicast and as a unicast via a content distribution (e.g., cable, satellite) or other network.

2. Description of Related Technology

The provision of content to a plurality of subscribers in a network is well known. In a typical configuration, the content is distributed to the subscribers' devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Just as different varieties of content delivery services have evolved over time, several different network architectures have also evolved for deploying these services. These architectures range from fully centralized (e.g., using one or more centralized servers to provide content to all consumers) to fully distributed (e.g., multiple copies of content distributed on servers very close to the customer premises, at the "edge" of the distribution network), as well as various other configurations. Some distribution architectures (e.g., HFC cable, HFCu, etc.) consist of optical fiber towards the "core" of the network, which is in data communication with a different medium (coaxial cable radio frequency, copper POTS/PSTN wiring, etc.) distribution networks towards the edge.

While the details of how video is transported in the network can be different for each architecture, many architectures will have a transition point where the video signals are modulated, upconverted to the appropriate channel (e.g., RF channel), and sent over the coaxial segment(s), copper wiring, (or air interface) of the network. For example, content (e.g., audio, video, etc.) is provided via a plurality of downstream ("in-band") RF QAM channels over a cable or satellite network. Depending on the topology of the individual plant, the modulation and upconversion may be performed at a node, hub or a headend. In many optical networks, nodes receive optical signals which are then converted to the electrical domain via an optical networking unit (ONU) for compatibility with the end-user's telephony, networking, and other "electrical" systems.

In U.S. cable systems for example, downstream RF channels used for transmission of television programs are 6 MHz wide, and occupy a 6 MHz spectral slot between 54 MHz and 860 MHz. Within a given cable plant, all homes that are electrically connected to the same cable feed running through a neighborhood will receive the same downstream signal. For the purpose of managing services, these homes are aggregated into logical groups typically called service groups. Homes belonging to the same service group receive their services on the same set of in-band RF channels.

Broadband data carriage in such networks is often accomplished using other (typically dedicated) QAM channels. For instance, the well known DOCSIS specifications provide for high-speed data transport over such RF channels in parallel with the video content transmission on other QAMs carried on the same RF medium (i.e., coaxial cable). A cable modem is used to interface with a network counterpart (such as a content delivery network (CDN) device) so as to permit two-way broadband data service between the network and users within a given service group.

Out-of-band (OOB) channels (and associated protocols) may be used to deliver metadata files to a subscriber device, as well as to provide communication between the headend of the content-based network and the subscriber devices.

Other systems and methods may also be used for delivering media content to a plurality of subscribers. For example, so-called "Internet Protocol Television" or "IPTV" is a system through which services are delivered to subscribers using the architecture and networking methods of an Internet Protocol Suite over a packet-switched network infrastructure (such as e.g., the Internet and broadband Internet access networks), instead of being delivered through traditional radio frequency broadcast, satellite signal, or cable television (CATV) formats. These services may include, for example, Live TV, Video On-Demand (VOD), and Interactive TV (iTV). IPTV delivers services (including video, audio, text, graphics, data, and control signals) across an access agnostic, packet switched network that employs the Internet Protocol (IP). IPTV is managed in a way so as to provide the required level of quality of service (QoS), quality of experience (QoE), security, interactivity, and reliability via intelligent terminals such as PCs, STBs, handhelds, TV, and other terminals. IPTV service is usually delivered over a complex and heavy "walled garden" network, which is carefully engineered to ensure sufficient bandwidth for delivery of vast amounts of multicast video traffic.

IPTV uses standard networking protocols for the delivery of content. This is accomplished by using consumer devices having broadband Internet connections for video streaming. Home networks based on standards such as "next generation" home network technology can be used to deliver IPTV content to subscriber devices in a home.

So-called "Internet TV", on the other hand, generally refers to transport streams sent over IP networks (normally the Internet) from outside the network (e.g., cable, HFCu, satellite, etc.) that connects to the user's premises. An Internet TV provider has no control over the final delivery, and so broadcasts on a "best effort" basis, notably without QoS requirements.

There are also efforts to standardize the use of the 3GPP IP Multimedia System (IMS) as an architecture for supporting IPTV services in carrier's networks, in order to provide both voice and IPTV services over the same core infrastructure. IMS-based IPTV may be adapted to be compliant with the IPTV solutions specifications issued by many IPTV standards development organizations (SDOs), such as, e.g., Open IPTV Forum, ETSI-TISPAN, ITU-T, etc.

While delivery of packetized (e.g., IP) content is well known in the prior art, the ability to provide delivery of packetized media content to a subscriber device over a content delivery network (e.g., cable television HFC, HFCu, satellite, etc.), other than over the Internet as afforded by virtue of a satellite, cable, or other such modem (i.e., "Internet TV"), and/or by using extant spectrum resources (e.g., via a CDN), has been lacking.

Particular systems have been developed to provide either unicast or multicast delivery of IP content. However, the foregoing systems may utilize adaptive bitrate (ABR) streams that are provided to requesting devices via unicast mechanisms (i.e., each user streams an individual copy of the requested content). Therefore, delivery of the packetized media content in a content delivery network as discussed above would be greatly bandwidth-inefficient. That is to say, typical content delivery networks do not have sufficient bandwidth capacity to support unicast delivery of IP packetized content to a large number of users or subscribers. Moreover, most network topologies and architectures (such as those discussed above) have a more efficient "multicast" capability which more effectively uses available bandwidth; however, most IP-enabled client devices do not support such multicast, and hence networks are relegated to use of the less efficient unicast or similar mechanism for delivery of IP streams.

As noted previously, today's IP video delivery from video server to video client has mainly two approaches: (i) IP multicast; and (ii) IP unicast. In IP multicast environment, one multicast video stream can be shared and viewed by many video clients. In IP unicast environment, each of the video client has its own video stream, although some of the viewers may view the same contents. A typical IP multicast can have significant bandwidth saving advantages when many viewers are viewing same programs. On the other hand, using the ABR (adaptive bit rate) technology, IP unicast allows video client to switch to video stream of different quality/bitrate in the different network environment to improve a viewer's viewing experience. For example, an IP unicast video client can request a video stream that has lower bitrate when low network bandwidth is available, and request a video with higher quality/bitrate when more bandwidth is available. In other words, IP unicast is more effective at managing changes in the network bandwidth, CPU, etc. as compared to an IP multicast delivery. Additional advantages of an IP unicast delivery include guaranteed packet delivery in a lossy network (at the cost of packet re-transmission through the entire network). However, overall the IP unicast delivery mode is significantly more taxing on the available bandwidth in a network, which is particularly salient when the network topology and infrastructure are constrained with a fixed bandwidth, or limited "build-out" capacity.

Hence, it would be desirable to provide mechanisms to take advantage of the benefits of an IP multicast and an IP unicast by combining these (i.e., in a cooperative or hybrid approach). Ideally, in one implementation, such mechanisms would achieve the network bandwidth saving benefit of IP multicast, and at the same time to preserve the viewer's viewing experience of IP unicast. Additionally, such mechanisms would enable a network operator to facilitate broadcast viewership for live television via IP streaming.

SUMMARY

The present disclosure addresses the foregoing needs by disclosing, inter alfa, apparatus and methods for the hybrid delivery of multicast and adaptive bitrate unicast content via a content distribution (e.g., cable) network.

In a first aspect, a method of providing content over a network having a plurality of users associated therewith is disclosed. In one embodiment, the method includes providing delivery of content to client devices via both multicast and unicast mechanisms, so that a network bandwidth consumption associated with the content delivery is lower than a corresponding unicast-only delivery solution; the delivery comprises in one variant an increased quality-of-service as compared to a corresponding multicast-only delivery solution.

In another aspect, a method of operating a content delivery network is disclosed. In one embodiment, the method includes: receiving a request is received from an IP-capable client device in communication with the network, the request indicating particular packetized content which is desired for display at the client device; determining whether a multicast for the requested packetized content exists; when said determination indicates that a multicast exists, joining the existing multicast; processing a stream of the content of the multicast to a format capable of being utilized by the client device; and causing delivery of the processed stream to the client device.

In another aspect, a content delivery network architecture is disclosed. In one embodiment, the architecture includes the ability to deliver a hybridization of traditional unicast and multicast features; e.g., enhanced bandwidth efficiency with adaptive bitrate and/or QoS-related features.

In another aspect, a network entity for use in a content delivery network is disclosed. In one embodiment, the entity comprises a network edge device, such as an edge server.

In another aspect, a method of operating the aforementioned network entity is disclosed.

In another aspect, a gateway apparatus for use in a content delivery network is disclosed. In one embodiment, the gateway apparatus is disposed within a subscriber premises of a managed network, and is in communication with one or more client devices via a wired or wireless interface (e.g., WLAN).

In another aspect, a method of operating the aforementioned gateway apparatus is disclosed.

In another aspect, a computer readable apparatus is disclosed. In one embodiment, the apparatus includes a storage medium and at least one computer program disposed thereon, the at least one program configured in one variant to enable a gateway apparatus to implement at least portions of one or more of the foregoing methods. In another variant, the at least one program enables a network entity (e.g., network edge or content server apparatus) to implement at least portions of one or more of the foregoing methods.

These and other aspects shall become apparent when considered in light of the disclosure provided herein.

BRIEF DESCRIPTION OF THE DRAWINGS

FIG. 3a is a logical flow diagram illustrating an exemplary embodiment of a generalized method for providing hybridized IP packetized content delivery according to the present disclosure.

Figure 1:
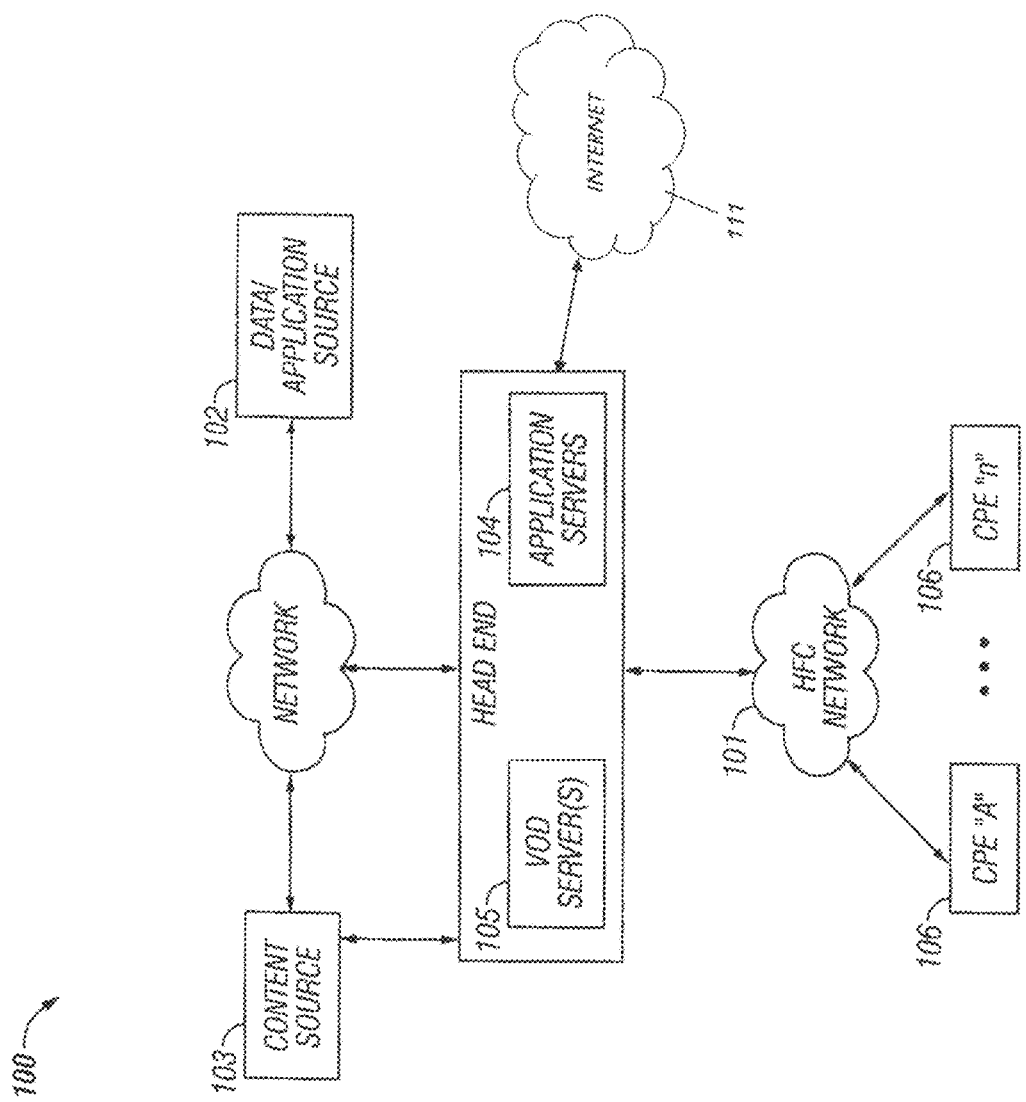
FIG. 1 is a functional block diagram illustrating an exemplary hybrid fiber network configuration useful with the present disclosure.

All Figures © Copyright 2013 Time Warner Cable, Inc. All rights reserved.

DETAILED DESCRIPTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or user's premises and connected to or in communication with a network.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO) that distributes programming to MSO clientele using client devices. Such programming may include literally any information source/receiver including, inter alfa, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including e.g., 802.11a/b/g/i/n/v/z.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee, narrowband/FDMA, OFDM, PCS/DCS, LTE/LTE-A, analog cellular, CDPD, satellite systems, millimeter wave or microwave systems, acoustic, and infrared (i.e., IrDA).

Overview

The present disclosure provides, inter alfa, methods and apparatus for providing delivery of packetized content to client devices via both multicast and unicast mechanisms, using an extant network infrastructure. In one aspect, a system is described to bridge multicast to unicast, so that the total network bandwidth consumption is significantly lower than a corresponding unicast-only delivery solution, yet which still provides improved quality of service and user viewing experience as compared to a multicast-only delivery solution. In addition, various aspects of the present disclosure are readily adapted for real-time multicast to unicast streaming of audio and data to, inter alfa, minimize network bandwidth usage, while maintaining the guaranteed delivery of unicast streams with little or no modification to the existing client device logic.

In one embodiment, a request is received from an IP-capable client device. The request indicates particular packetized content which is desired for display at the client device (or a proxy thereof). A gateway device (or service node entity) determines whether an existing multicast is already established for the requested packetized content, and if so joins the existing multicast. The gateway processes the multicast stream to a format capable of being received and/or rendered at the requesting device, and delivers the content thereto.

Alternatively, when a multicast has not been previously established, a network edge device (or other network entity) determines whether the content is to be provided via a multicast. The determination may be based in one implementation on a current number of requests, historical patterns, and/or the identity of the particular content (and/or the content provider).

In the instance that the content is not to be provided as a multicast, the requesting device receives the content as a unicast stream from a unicast server (either directly or via a gateway or other proxy). In the instance the content is to be provided as a multicast, the edge device generates in one implementation a single program transport stream (SPTS) including the identified content. The identified content is then switched into delivery on available QAM dedicated to the multicast delivery of IP packetized content and delivered via a multi-program transport stream (MPTS). The gateway entity joins the multicast and receives the MPTS, the contents of which are processed and delivered to the requesting device.

In one embodiment, the gateway processes the content from the multicast format to a format compatible with the requesting device. It is further appreciated that in the event other client devices serviced by the node or gateway were previously receiving the identified content as a unicast stream, the gateway may facilitate a switch of these devices from the unicast stream to the newly added multicast stream.

In a further embodiment, the system may identify when content should no longer be provided as a multicast stream (such as when network conditions change and/or according to pre-determined schedule), and cause the particular content to no longer be provided as a multicast. Accordingly, the gateway causes the devices currently receiving the content to switch from the multicast to a unicast delivery thereof.

Various operational/business rules are also provided for e.g., enabling and disabling trick mode functions with respect to playback of the requested content. In addition, content protection schemes are in one variant advantageously deployed at e.g., the gateway, the client device, and/or one or more network entities. Furthermore, various mechanisms for error recovery and increased multiplexing efficiency may be implemented.

Detailed Description of Exemplary Embodiments

Exemplary embodiments of the apparatus and methods are now described in detail. While these exemplary embodiments are described in the context of the aforementioned hybrid fiber coax (HFC) cable system architecture having an multiple systems operator (MSO), digital networking capability, IP delivery capability, and plurality of client devices/CPE, the general principles and advantages of the present disclosure may be extended to other types of networks and architectures, whether broadband, narrowband, wired or wireless, managed or unmanaged, or otherwise, the following therefore being merely exemplary in nature.

It will also be appreciated that while described generally in the context of a consumer (i.e., home) end user domain, the present disclosure may be readily adapted to other types of environments (e.g., commercial/enterprise, government/military, etc.) as well. Myriad other applications are possible.

Also, while certain aspects are described primarily in the context of the well-known Internet Protocol, it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Network

FIG. 1 illustrates a typical content delivery network configuration with which the exemplary apparatus and methods of the present disclosure may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101(also referred to herein as a content delivery network (CDN)). The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. As will be discussed in greater detail below, in one embodiment the CPE may include IP-enabled CPE 107 (although not illustrated in FIGS. 1-1d), and a gateway or specially configured modem (e.g., DOCSIS cable modem).

Figure 1A:
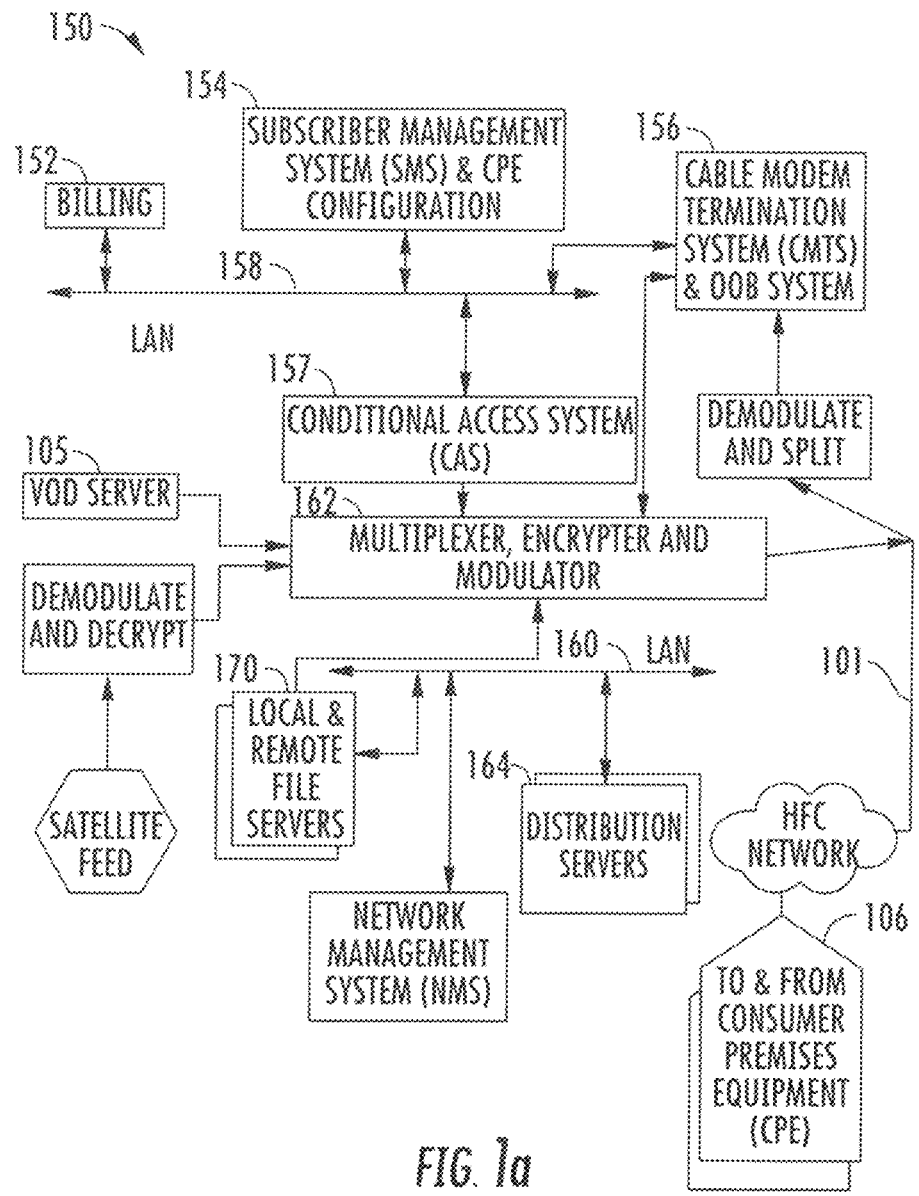
FIG. 1a is a functional block diagram illustrating one exemplary network headend configuration useful with the present disclosure.

Referring now to FIG. 1a, one exemplary embodiment of a headend architecture useful with the present disclosure is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture and that each MSO may have multiple headends deployed using custom architectures.

Figure 1B:
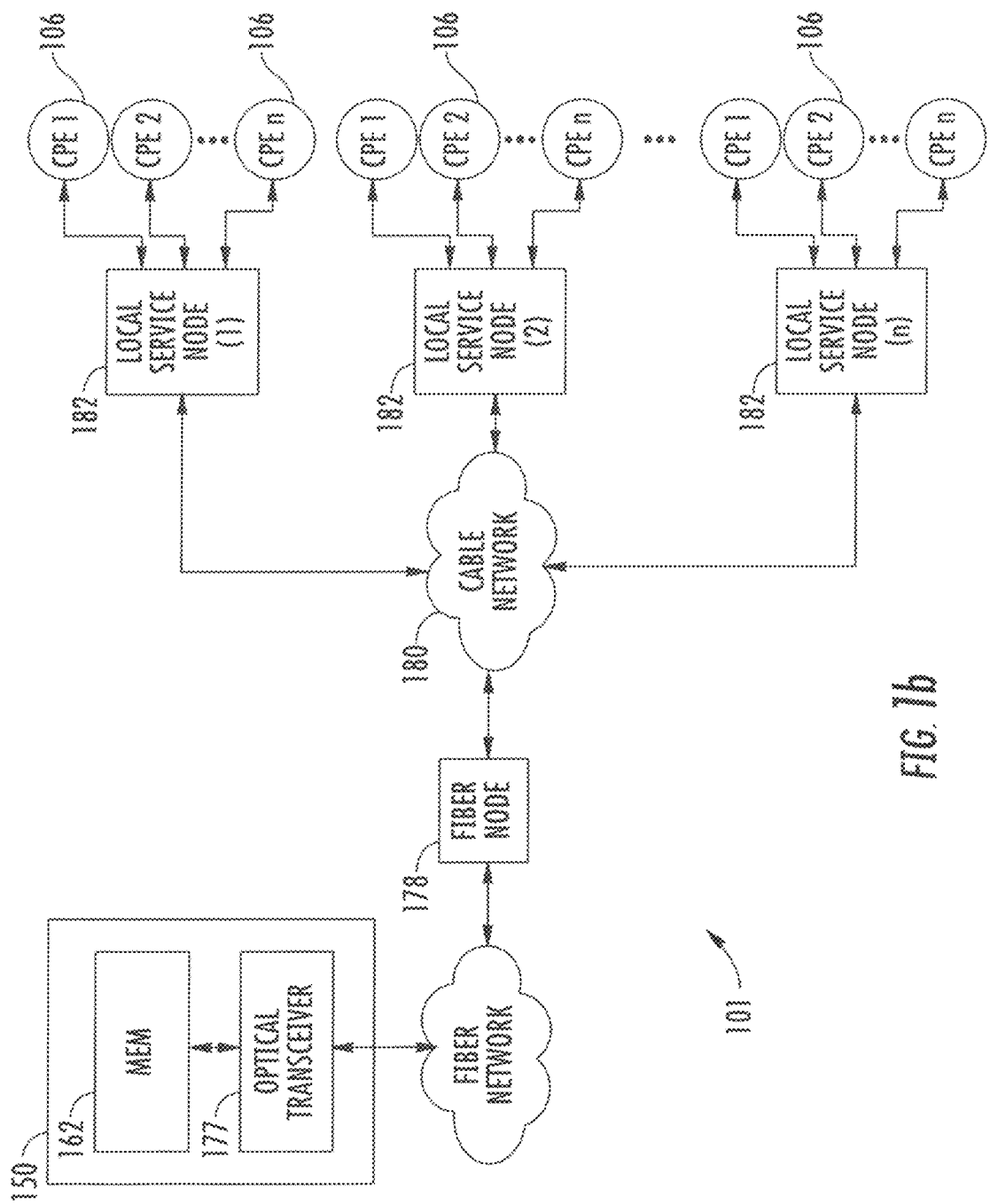
FIG. 1b is a functional block diagram illustrating one exemplary local service node configuration useful with the present disclosure.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
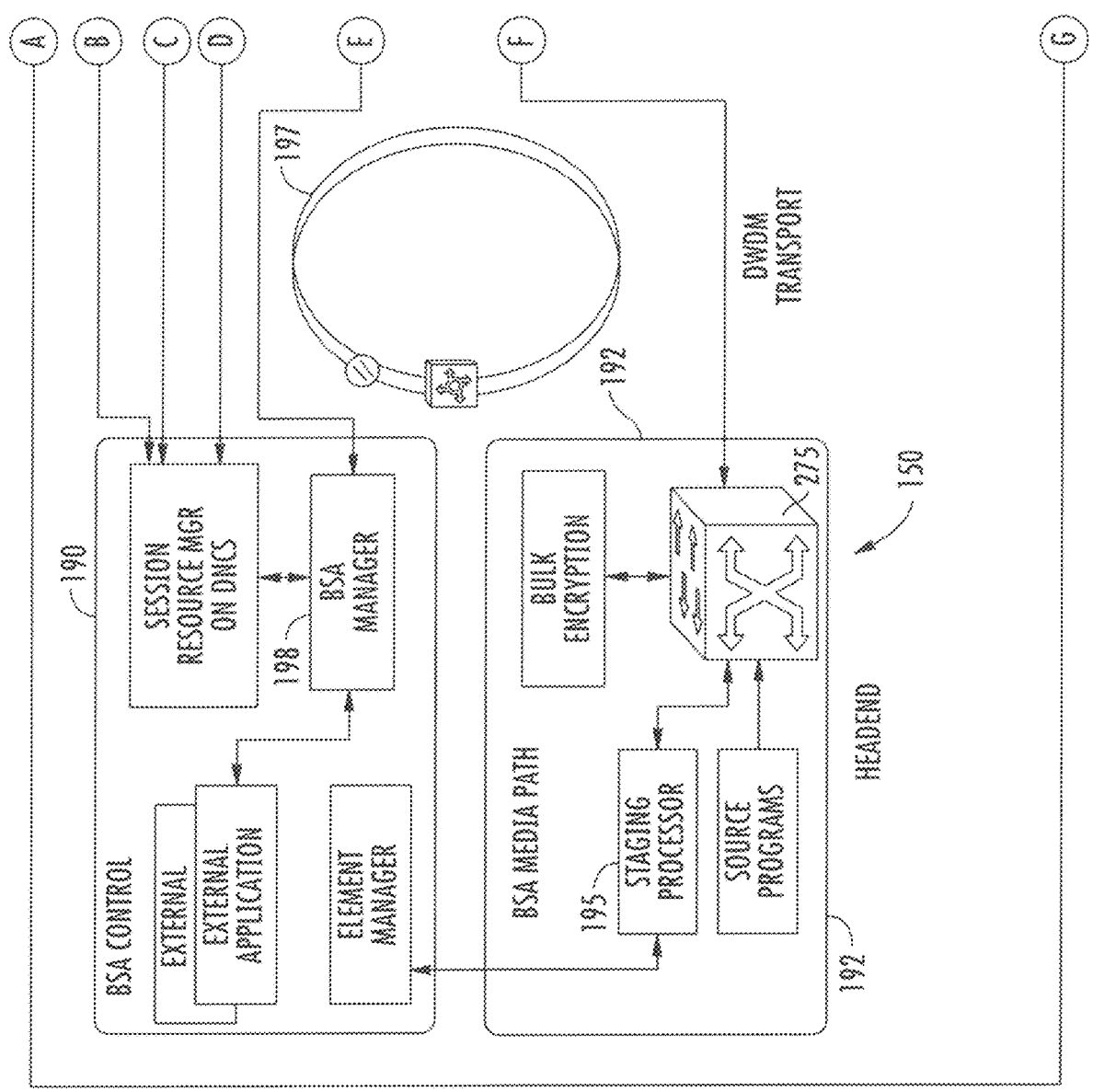
FIG. 1c is a functional block diagram illustrating one exemplary broadcast switched architecture (BSA) network useful with the present disclosure.
Figure 1C:
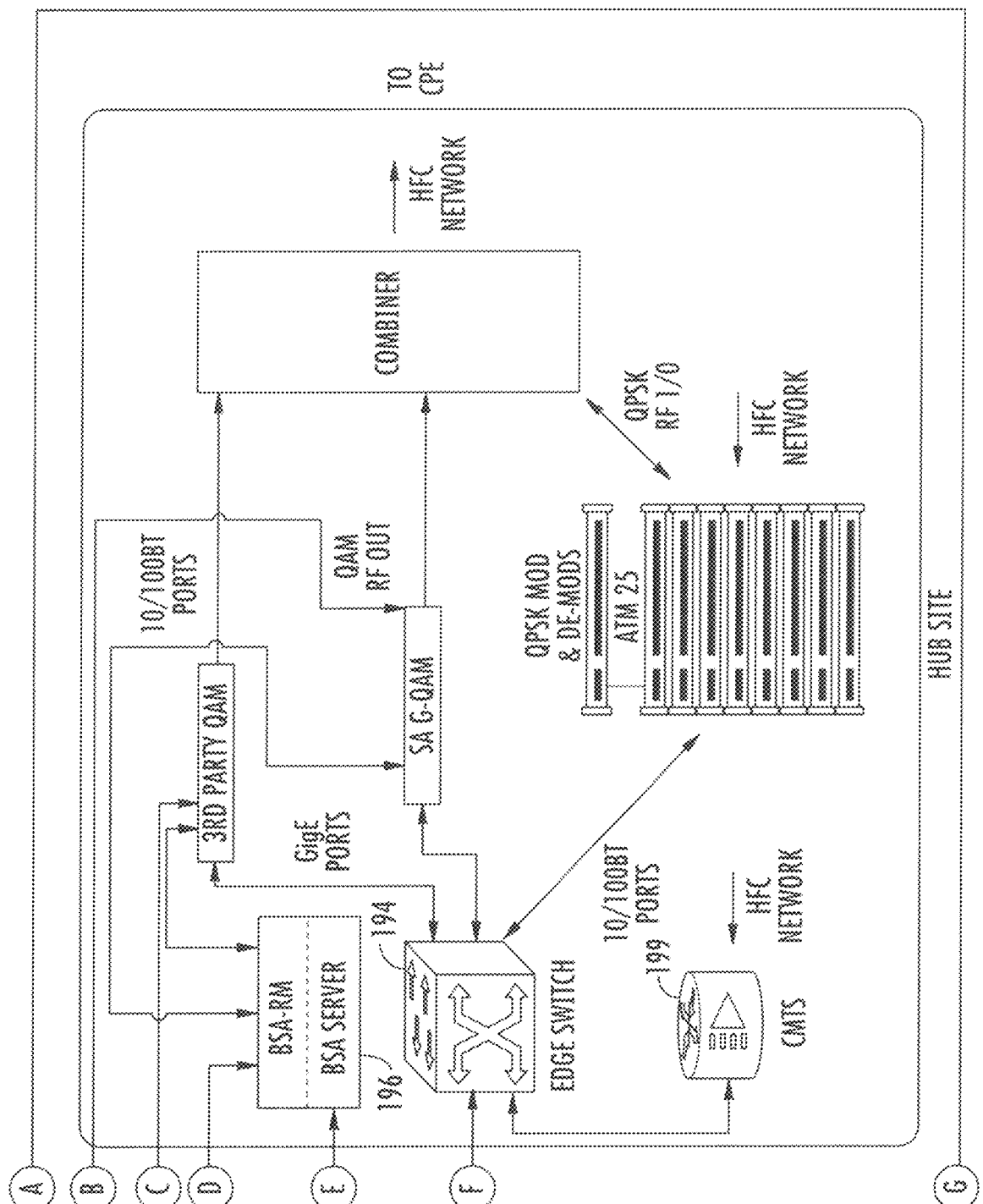

It will also be recognized, however, that the multiplexing operation(s) need not necessarily occur at the headend 150 (e.g., in the aforementioned MEM 162). For example, in one variant, at least a portion of the multiplexing is conducted at a BSA/SDV switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alfa improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the disclosure is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

An optical transport ring (not shown) is also commonly utilized to distribute the dense wave-division multiplexed (DWDM) optical signals to each hub within the network in an efficient fashion.

"Switched" Networks

FIG. 1c illustrates an exemplary "switched" network architecture. While a so-called "broadcast switched architecture" (BSA), also known as "switched digital video" or "SDV", network is illustrated in this exemplary embodiment for performing bandwidth optimization/conservation functions, it will be recognized that the present disclosure is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these elements cooperating to control and feed, respectively, downstream or edge switching devices 194 at the hub site which are used to selectively switch broadcast streams to various service groups. A BSA or SDV server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

As previously referenced, U.S. patent application Ser. No. 09/956,688 entitled "TECHNIQUE FOR EFFECTIVELY PROVIDING PROGRAM MATERIAL IN A CABLE TELEVISION SYSTEM" describes one exemplary broadcast switched digital architecture useful with the present disclosure, although it will be recognized by those of ordinary skill that other approaches and architectures may be substituted.

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

In one exemplary embodiment, the methods and apparatus of co-owned U.S. patent application Ser. No. 12/841,906 filed on Jul. 22, 2010 and entitled "APPARATUS AND METHODS FOR PACKETIZED CONTENT DELIVERY OVER A BANDWIDTH-EFFICIENT NETWORK", which issued as U.S. Pat. No. 8,997,136 on Mar. 31, 2015 and is incorporated herein by reference in its entirety, may be utilized. As discussed therein, packetized content is provided to subscribers of an MSO network via extant bandwidth-optimized network infrastructure. In one embodiment, various legacy and IP-capable user devices receive a list of available content, from which a user may select. The user's selection is transmitted to an intermediary device or proxy (such as gateway apparatus in the home, or a headend server) which formats the request according to a standardized protocol utilized by a server (e.g., the BSA/SDV server of FIG. 1c) for providing bandwidth-optimized delivery of content. The server uses one or more bandwidth optimization techniques to provide the requested content to the proxy. If the content is requested by an IP-capable device, the proxy formats the content using protocol translation. The formatted content is then delivered to the requesting IP-capable CPE. However, if the content is requested from a legacy device (e.g., a non-IP enabled STB), protocol translation is not necessary. In this manner, IP and legacy CPE can be freely intermixed in any proportion in the service group and home, the gateway or headend proxy being configured to deliver content regardless of the requesting device.

In another exemplary embodiment, the edge switch 194 (generally located in the distribution hub as shown in FIG. 1c) is flooded with all available programs (so-called "dense" mode) Alternatively, the system may be configured to operate in a "sparse" mode, wherein IP streams are only delivered when the SDV server/resource manager requests them (such as via signaling the QAM modulator, which signals the router to perform a multicast membership request for a stream not presently carried). In this latter case, the physical switching function takes place in the router (as requested by the QAM modulator, responsive to the SDV server/resource manager request). The SDV server/resource manager is often located in the headend (versus the hub), since payloads do not pass through it, only control traffic.

Under the "flooding" (sometimes called "dense") paradigm, transport efficiency may be improved through use of simple unidirectional "drop and continue" protocol performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

Packetized Content Delivery Network

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. Patent Application Publication No. 2011/0103374 filed on Apr. 21, 2010, and entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, etc.; however, it is appreciated that the various features of the present disclosure are in no way limited to any of the foregoing architectures.

Hybridized Delivery Network Architecture

Figure 2A:
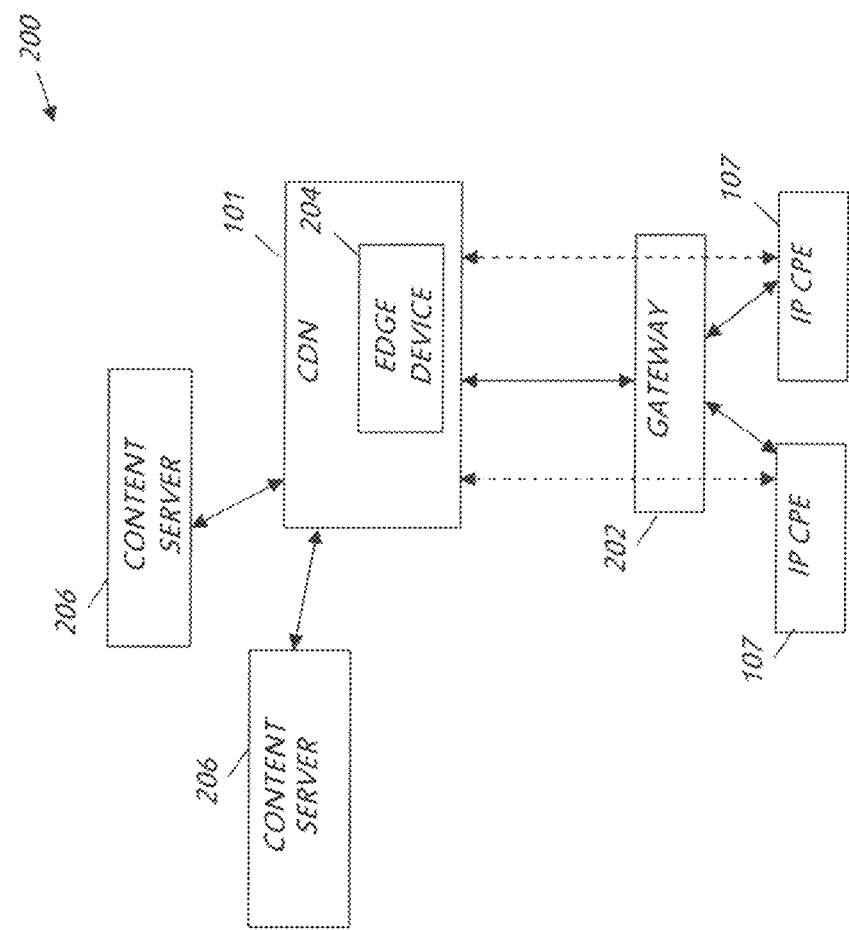
FIG. 2a is a functional block diagram illustrating an exemplary embodiment of a content delivery network architecture configured in accordance with the present disclosure.

Referring now to FIG. 2a, a first exemplary embodiment of a "hybrid" network architecture 200 for the delivery of packetized (such as IP packetized) content in both adaptive bitrate unicast and a non-adaptive bitrate multicast is illustrated.

As shown, the network 200 generally comprises a plurality of content servers 206 in communication with a plurality of IP capable CPE 107 via content delivery network (CDN) 101. In the illustrated embodiment, a gateway apparatus 202 facilitates communications to/from the network 101. As will be discussed in greater detail below, a streaming entity 204 is provided at the edge of the network which determines whether to provide a multicast stream for content requested by an IP CPE 107, or to enable unicast delivery thereto. Note that while the present discussion is cast in terms of an alternative (i.e., unicast or multicast), it will be recognized that both types of delivery may occur simultaneously to a premises (or even a given device) consistent with the disclosure.

In the instance a multicast stream is to be provided, the edge device or other network entity may further provide a mechanism whereby various ones of the CPE 107 may switch between the multicast and unicast delivery and/or other processing features. That is to say, when it is determined that particular content should be provided as a multicast IP stream, the edge device 204 (or in an alternative embodiment, the gateway 202) may provide a mechanism to not only provide the requested content to the most recent requesting CPE 107, but also a mechanism for enabling other devices which were previously receiving the requested content to switch from a unicast delivery thereof, to the newly created multicast stream.

Although not illustrated, it is appreciated that one or more legacy CPE may be in communication with the network 101 for receipt of content therefrom (via e.g., a legacy modem). As noted elsewhere herein, the network 101 may be configured to provide both packetized (such as IP packetized) content and non-IP packetized content (e.g., MPEG-2) to the devices in communication therewith, the latter being utilized by the legacy devices 106. It will also be appreciated that the legacy CPE 106 may be further configured to incorporate IP connectivity with sufficient bitrate (e.g. MoCA or a wired or wireless Ethernet/WLAN connection) and, via a software/firmware update, be re-purposed to view IP content, and even utilize DRM encryption given the proper media player and/or software decryption capability. The present disclosure contemplates that user premises may be configured according to one of the three foregoing forms (i.e., legacy only, mixed IP and legacy, and IP only), although other configurations are possible consistent with the disclosure.

As illustrated, the edge device 204 communicates with one or more entities of the network headend 150 in order to determine whether content is to be provided via a multicast. In one embodiment, the edge devices 204 comprises (or is in communication with) a database (not shown) that is dynamically updated to contain information regarding the content available for multicast delivery. Still further, the edge device 204 may comprise an operational/business rules engine for implementing one or more operational and/or business rules for determining whether to cause content to be provided via multicast or unicast streaming.

It will be appreciated that the provided content may include web-based content, the entire carrier class stream (as discussed in co-owned U.S. patent application Ser. No. 12/841,906, which is incorporated herein by reference in its entirety), and/or any content which would ordinarily be broadcast to the devices, encoded in MPEG-4 (or other IP encoding standard or codec). For example, broadcast content, VOD content, so called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" content (described in co-owned U.S. patent application Ser. No. 10/913,064 filed Aug. 6, 2004, published as U.S. Patent Publication No. 2005/0034171, and entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned U.S. patent application Ser. No. 10/913,064 previously incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety) may be among the content which may be provided to the IP CPE 107 as either a multicast or unicast IP stream according to the present disclosure. Other types of content (and content delivery paradigms) may also be utilized consistent with the present disclosure.

Figure 2B:
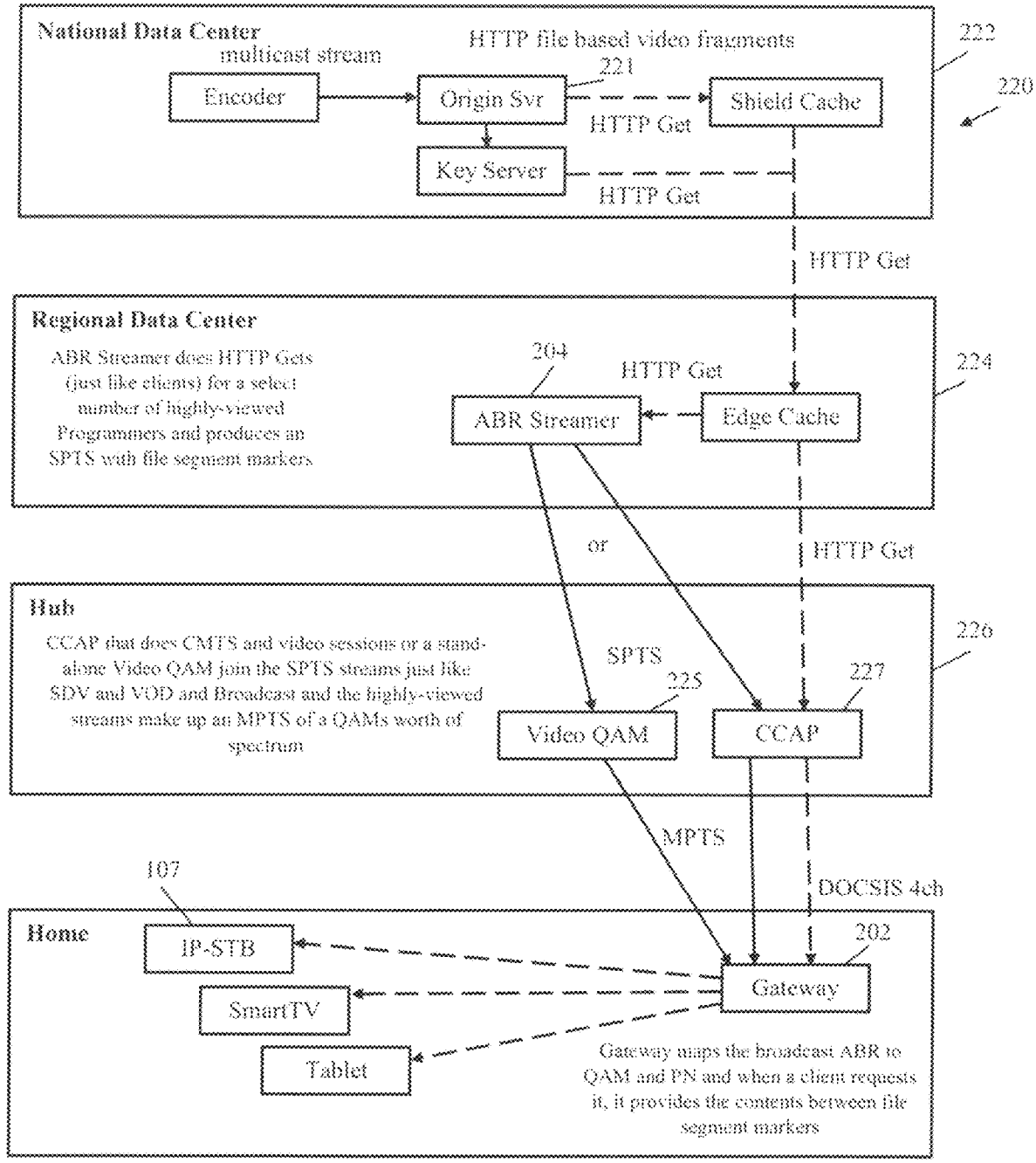
FIG. 2b is a functional block diagram illustrating a detailed embodiment of an exemplary content delivery network architecture configured in accordance the present disclosure.

Referring now to FIG. 2b, another exemplary embodiment of an architecture 220 for delivery of packetized (such as IP packetized) content as either an IP multicast or an IP unicast is illustrated. As shown, the embodiment of FIG. 2b generally comprises a (e.g., national) data center 222 wherein content is delivered via a multicast stream from an encoder to an origin server 221. In the illustrated embodiment, the origin server 221 stores the content as hypertext transfer protocol (HTTP) file-based video fragments. A key server and caching entity are also provided to assist in content storage and retrieval from the origin server 221 at the national data center 222. In particular, the key server may comprise a DRM (Digital Right Management)/encryption key management server which generates/manages and stores content encryption keys. An ABR streamer 204 and associated edge cache entity are provided at a regional data center 224 (or edge) of the network 220.

Multicast IP packetized content is provided in the embodiment FIG. 2b to the various in home devices 107 through a proxy such as e.g., the gateway apparatus 202, which is in communication with the ABR streamer 204 via a video QAM device and/or a converged cable access platform (CCAP). In one exemplary embodiment, the gateway apparatus 202 comprises a wireless or advanced wireless gateway (AWG). The exemplary AWG is configured to support both unicast and multicast (i.e., receive IP packetized content as via a unicast delivery as well as a multicast delivery, such as within an MPTS). In addition, the AWG is further configured to convert content received on the multicast to unicast for delivery to devices that only support unicast.

In the network of FIG. 2b, the client devices 107 may receive unicast content directly from a network entity, such as e.g., a cache at the regional data center 224, national data center 222, or hub 226 (cache not shown at the hub for ease of illustration). According to this embodiment, however, the unicast requests may still be transmitted and evaluated by the gateway 202 (as noted elsewhere herein) for a determination as to whether the requested content is among that provided for multicast delivery. Alternatively, the devices 107 may rely on the gateway 202 for delivery of unicast content as well.

The architecture of FIG. 2b can be used e.g., for providing a so-called "dynamic broadcast". In one embodiment, particular streams are identified and modified to be "broadcast" on the system on a dynamic basis (such as via an IP multicast thereof), while other content is unicast on an as needed basis. It is noted that the terms "broadcast" and "multicast" are used herein to refer broadly to a distribution of the (IP) stream to more than a single user; such distribution may occur according to traditional broadcast and multicast schemes, as well as according to other well known delivery schemes (e.g., "anycast", "geocast", etc.).

In one particular embodiment, the ABR streamer 204 of the network of FIG. 2b is provided which establishes a set amount of bandwidth for "broadcast" of IP content (i.e., a particular amount of QAM spectrum). The streamer 204 determines which particular programs are to be dynamically switched into the earmarked bandwidth. In this manner, the edge streamer 204 controls, in part, the functioning of the video QAM 225 and/or CCAP 227 by notifying these entities which content will be added to the MPTS stream generated thereby (see discussion below). In one exemplary embodiment, the edge streamer 204 allocates an amount of the QAM spectrum based on overall capacity and/or historical use information i.e., information relating to the use of the IP multicast allocated bandwidth in the past. In addition, the edge streamer 204 may take into account the historical and/or current requests for and bandwidth utilized by each of unicast IP content delivery, multicast IP content delivery, and non-IP content delivery. In one particular example, one QAM is identified for the delivery of multicast IP content. The allocated QAM is used to set up SDV-like video sessions (as discussed elsewhere herein) of the requested ABR streamer 204 multicast SPTS, and an MPTS that is broadcast on the plant is generated for delivery on the allocated and remaining QAM.

In one embodiment, the dynamic switching determination may be made in a manner similar to that discussed in co-owned U.S. patent application Ser. No. 09/956,688 filed on Sep. 20, 2001, published as U.S. Patent Application Publication No. 2003/0056217 and entitled "Technique for effectively providing program material in a cable television system", which issued as U.S. Pat. No. 8,713,623 on Apr. 29, 2014 and is incorporated herein by reference in its entirety. Specifically, as discussed therein, when a subscriber selects a program to watch, the selection request is transmitted to a headend of the system (such as a network edge). In response to such a request, a controller in the headend (e.g., the edge streamer 204) determines whether the material of the selected program channel is currently being made available to the neighborhood. If it is currently being made available, the controller enables the requesting device to receive the content. In the present example, this would include identifying to e.g., a gateway device 202 in communication with the requesting device a multicast to join. As will be discussed in greater detail elsewhere herein, the gateway 202 joins the multicast and processes the content for delivery to the requesting device. If the requested program is not currently being made available (e.g., currently "broadcast") and it is determined that it should be added to the "broadcast" content, the controller assigns an unused carrier within the designated bandwidth to carry the requested program material. Once again, the gateway 202 is informed of the multicast; it joins, processes the content, and provides delivery to the requesting device. The controller (e.g., edge streamer 204) is further configured to determine when to retire those carriers assigned for programs which no longer meet the requirements for "broadcast" delivery (such conditions will be discussed in greater detail below).

For example, the network may identify e.g., CNN as qualifying for the "broadcast" pool because it is a "popular" channel. However, the popularity of the programming on CNN may vary throughout the day. Hence, instead of constantly providing the contents of the particular channel, CNN, the edge streamer 204 instead may relegate "broadcast" delivery of CNN to only those times when it is popular. That is to say, if CNN is only popular between 6-8 am and 5-6 pm, the edge streamer 204 will only provide it in the dedicated "broadcast" bandwidth during those times, and at the other times it is made available via unicast delivery to the particular requesting devices (i.e., it is "switched" out of delivery). It is further noted that the ABR streamer 204 when it makes "broadcast" delivery decisions, will notify each service node and/or gateway 202. In this manner, when a particular device 107 requests particular IP packetized content, the request is evaluated by the gateway 202. The gateway 202 evaluates the request against a known set of available multicast (or broadcast, etc) IP streams and either joins an existing multicast or enables the requesting device to establish a unicast session with the network.

It is further appreciated that the determination of which programs and/or channels will be added to the multicast may be based on historical use patterns evaluated via a recommendation engine. In one variant, the recommendation engine disclosed in co-owned U.S. patent application Ser. No. 12/414,576 filed on Mar. 30, 2009, entitled "RECOMMENDATION ENGINE APPARATUS AND METHODS", and issued as U.S. Pat. No. 9,215,423 on Dec. 15, 2015, which is incorporated herein by reference in its entirety, may be utilized. As discussed therein, content may be identified and recommended to a particular user (or group of users) via one or more mechanisms for particularly selecting content to align with a user's preferences (the latter which need not enter manually). The content identified/recommended is compiled from various distinct sources, including, inter alia, DVR, broadcasts, VOD systems, start over systems, etc. In addition, the exemplary recommendation engine may learn (and unlearn) preferences of a user or group of users based on actions taken with regard to content.

Additional bandwidth efficiencies may be realized from the network 101 to the plurality of gateway 202 (or service node entities) in communication therewith. In other words, as more clients requests the same video content, the system may instruct more gateways to join the multicast stream and thus save network bandwidth from the video source to these gateway apparatus.

Referring again to FIG. 2b, the exemplary architecture 220 provides the ABR streamer 204 to convert the file-based HTTP video back to a multicast stream. As illustrated, the process by which the edge streamer 204 retrieves the content from the entities of the national data center 222 relies, in one embodiment, on the standard HTTP GET requests. However, other communications protocols may be utilized with equal success. In one embodiment, the ABR streamer 204 is configured to process the segmented or fragmented video content into a multicast or broadcast stream for provision to a hub 226. The edge streamer 204 produces SPTS for each of the IP packetized content which is to be delivered as a multicast. The generated SPTS each include file segment markers for use by the gateway 202 for processing, as will be discussed in greater detail below with respect to FIGS. 4a and 4b.

At the hub, the converted multicast stream is placed on available QAM. In one embodiment, a traditional video QAM device 225 may be used to place the SPTS streams for various ones of content to be provided as a multicast onto a multi-program transport stream (MPTS) and deliver this MPTS to the gateway 202. As also illustrated in FIG. 2b, in another embodiment, a CCAP 227 may be utilized for distribution of the SPTS onto particular QAM and delivery thereof to the gateway 202.

The CCAP 227 is configured to combine data and video delivery within a single platform, as opposed to the data and video being managed by separate devices (such as the aforementioned video QAM 225 and a distinct data QAM (not shown)). The exemplary CCAP 227 may be for example of the type manufactured by Motorola® and described in "CCAP 101: Guide to Understanding the Convereged Cable Access Platform", February 2012, which is incorporated herein by reference in its entirety. Alternatively, the CCAP may comprise any headend component that provides the functionality of a CMTS and an edge QAM in a single architecture with increased QAM density and overall capacity, which is compatible with "Data-Over-Cable Service Interface Specifications (DOCSIS): Converged Cable Access Platform: Converged Cable Access Platform Architecture Technical Report" CM-TR-CCAP-V03-120511, May 11, 2012, incorporated herein by reference in its entirety.

The video QAM 225 and/or CCAP 227 generated MPTS comprises, in one embodiment, IP packetized content selected for "broadcast" distribution, as well as other broadcast content (whether IP packetized or legacy). In this manner, non-IP capable CPE 106 may still receive content from the network.

Although illustrated as providing the QAM multicast to a single gateway 202, it is appreciated that the video QAM 2205 and/or CCAP 227 may distribute content to various gateway devices in a service group. As will be discussed in greater detail below, business decisions with respect to which content will be designated for non-unicast delivery may be made based on popularity and other network conditions (such as bandwidth availability) within a given service group.

The gateway apparatus 202 receive the broadcast MPTS and processes the content therein to provide requested content to the appropriate devices 107. A description of exemplary processing performed by the gateway will be discussed below with respect to FIGS. 4a and 4b.

Figure 2C:
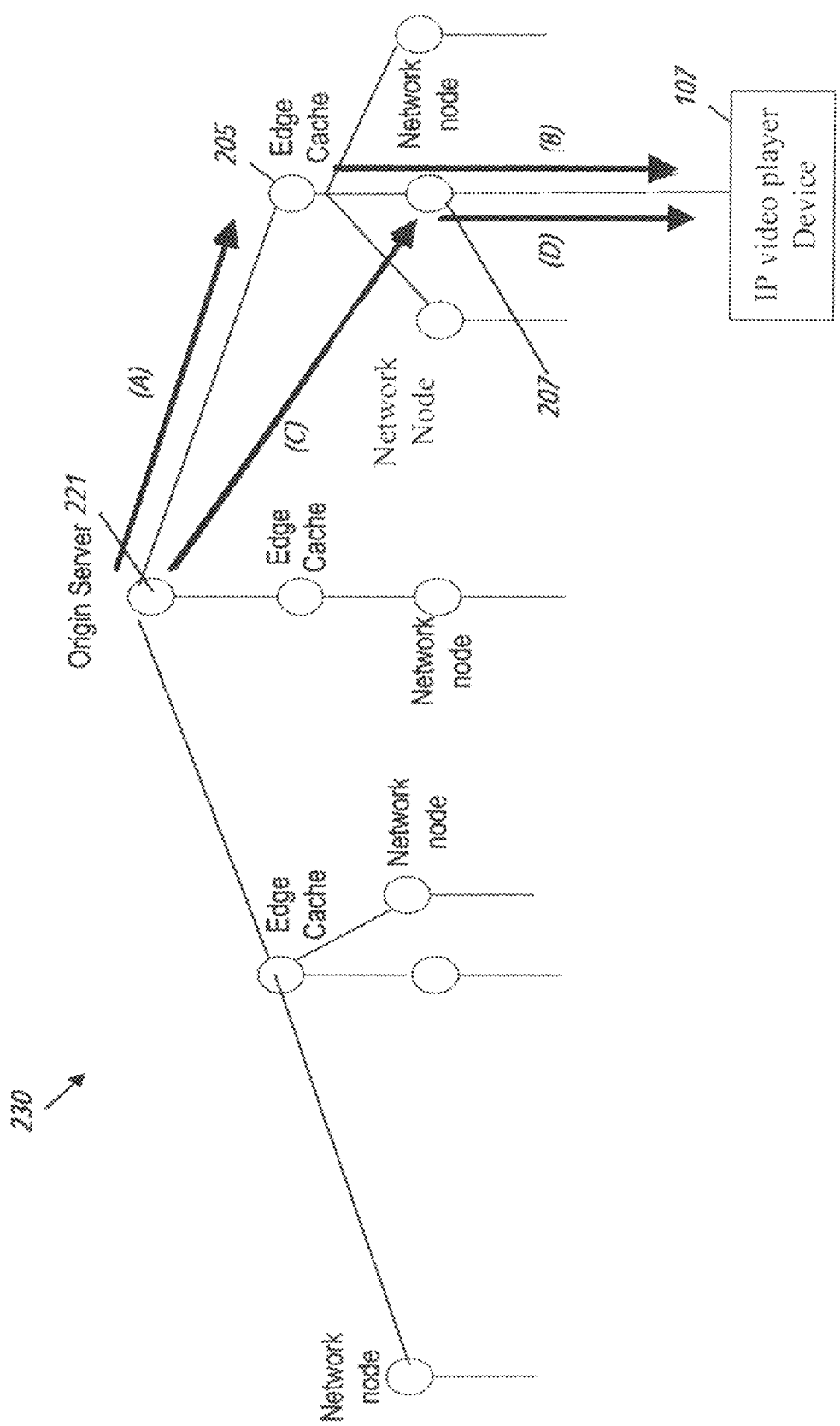
FIG. 2c is a functional block diagram illustrating a second detailed embodiment of an exemplary content delivery network architecture configured in accordance with the present disclosure.

Referring now to FIG. 2c, another exemplary embodiment of a network architecture 230 for use in providing the herein disclosed delivery of IP packetized content over both multicast and unicast delivery mechanisms is illustrated.

As occurs in the network embodiments discussed above, the architecture 230 of FIG. 2c provides two separate pathways for delivery of content to the requesting device 107. In certain instances (as discussed elsewhere herein), a network edge server (such as, e.g., the ABR server 204 discussed above) located at the network edge determines that requested IP content is to be delivered as a multicast stream on pre-allocated QAM. When this occurs, the origin server 221 publishes the requested content to the edge cache servers 205 (see e.g., pathway (A) of FIG. 2c). In order for this to occur, an entity at the network edge (such as e.g., the edge streamer 204) requests the content from the origin server 221 and formats it into a format suitable for transmission over QAM to the network node 207. The network node 207 comprises at least one entity (such as e.g., the aforementioned gateway 202) configured to join the multicast and process the received content to a format compatible with the requesting device 107. The node 207 delivers content to the device 107 as shown in pathway (B).

When it is determined (such as by the edge device 204 and/or a gateway 202) that the requested content is to be provided via a unicast stream, the content is delivered from the origin server 221 to a network node 207 via pathway (C), then forwarded to the device 107 via pathway (D).

It is appreciated that the multicast IP content may be provided from the network edge devices (such as e.g., the ABR streamer 204, video QAM 225, CCAP 227, etc.) in any of FIGS. 2a-2c as a multiplex of the type well known in the art. In other words, a multiplex comprising requested multicast IP content, and other content (whether IP or legacy) is generated and delivered. Furthermore, the exemplary architectures discussed herein (e.g., FIGS. 2a-2c) may advantageously allow for free intermixing of IP and non-IP content (e.g., MPEG-4 and MPEG-2 encoded streams). Specifically, as noted above, the multiplex may comprise e.g., both IP packetized and non-packetized content (of any codec including, e.g., MPEG-4 and MPEG-2). In the instance broadcast switched mechanisms are used (as discussed in greater detail elsewhere herein), an SDV server 196 (or other entity having such functionality) switches both types of content in or out of the multiplex for delivery across the network. The entity delivering the multiplex (e.g., video QAM 225, CCAP 227, etc.) is, in one implementation, never made aware of the payload type (e.g., MPEG-2 or MPEG-4) for requested content, thereby providing delivery of IP content to match user requests without requiring any knowledge of what type of content it is carrying ("agnostic" delivery). Moreover, there is no predetermined ratio of packetized to non-packetized content in the present system; the multiplex can literally range from having all one type of content, to all of the other, to any mix or proportion therebetween.

Methods for the delivery of IP packetized content as either a multicast or a unicast consistent with the present disclosure and using the exemplary architecture of FIGS. 2a-2c will be discussed in greater detail below.

Exemplary Methodology

Referring now to FIG. 3a, an exemplary embodiment of a method 300 for the delivery of packetized content as a multicast in some instances, and a unicast in other instances (e.g., so called hybridized delivery), is shown.

Per step 302, a request for content is received from a requesting IP capable CPE 107. In one exemplary embodiment, the request is received first at a gateway apparatus 202 (or other service node device). In other words, the gateway apparatus 202 facilitates communication between the client 107 and the CDN 101. For instance, the IP CPE 107 may transmit this request using e.g., Digital Living Network Alliance (DLNA) protocol to the gateway device 202. Alternatively, the IP CPE 107 may transmit the request directly to the network 101.

The gateway apparatus 202 determines whether the content requested is among that content currently being provided in an existing multicast stream (step 304). For example, the gateway 202 may, prior to receipt of the request, be provided information relating to each of the IP programs identified for multicast IP delivery. Such information may include e.g., a program identifier (PID) or other means for enabling simple identification of the target program; the information is derived by and provided from e.g., the ABR server 204. The information is stored at a storage device in communication with the gateway 202 and updated periodically or dynamically as changes to the network are identified (discussed below). In this manner, the gateway 202 evaluates information in the request (such as e.g., PID) against the aforementioned stored information to determine whether a requested program has been previously designated as "popular" (or otherwise pre-designated for multicast delivery).

In an alternative embodiment, the gateway 202 stores a data structure (e.g., dynamically updated table) comprising information relating to each of the URL associated to content that is provided via a multicast. The gateway 202 then utilizes a URL provided in the CPE 107 request to determine whether the requested content is among those URL is currently multicast. It is further appreciated that a database or list of content available as a multicast may be provided to another network entity, such as e.g., the ABR server 204, and/or client device 107 (and updated as necessary).

If it is determined that a multicast for delivery of the identified content exists, the process continues at step 314 (i.e., the gateway 202 joins the multicast; discussed below). In other words, because the request is sent over normal DOCSIS to the CDN, the gateway 202 is able to intercept any HTTP GET transmission for file fragments that it knows are in a broadcast stream.

Alternatively, if it is determined that a multicast for delivery of the identified content does not yet exist, per step 306, it is next determined whether one should be created based on e.g., the popularity of the particular content given the most recent request therefor. The streamer 204 and/or gateway 202 may be configured to recognize conditions for programs to be designated for a multicast. In one embodiment, the conditions are pre-established in the form of one or more operator-entered business rules. Such business rules may indicate, for example, that if a threshold number of requests for particular content are received within a service group and/or during a pre-determined time period, the content may be switched into multicast delivery.

If, upon evaluating the request, it is determined that the identified content will not be delivered via a multicast, per step 308, it is instead delivered via unicast mechanisms to the requesting device 107. In one embodiment, the unicast delivery comprises a direct communication between the CDN 101 and the IP device 107. Alternatively, the gateway 202 may still act as a go-between for the CDN 101 and device 107; optional processing at the gateway 202 may also be performed (as discussed with respect to step 316 below). In the event the gateway 202 acts as a proxy for communication with network 101 entities, such functionality may be made invisible to some or all of the entities involved in the communications. For example, the network 101 entities may be unaware that communication is being routed through a gateway apparatus 202 to the requesting device 107.

If, upon evaluating the request, it is determined that the identified content will be delivered via a multicast, per step 310, the edge device 204 requests and processes the content fragments. In one variant, the edge device 204 retrieves the HTTP file-based fragments associated with the identified content, which are stored at the origin server 221 using an HTTP GET request. In other words, the ABR streamer 204 acts like a normal HTTP client for a subset of programs that are highly popular, or are otherwise identified for multicast delivery. The edge device 204 produces an SPTS for the IP packetized content, which include file segment markers that are used by the gateway 202 during its processing steps (discussed below; see e.g., FIGS. 4a and 4b).

In addition, logic at the streamer 204 is utilized (at step 312) to cause the downstream QAM delivery entities (i.e., the video QAM 225 and/or CCAP 227) to switch the particular content into a multicast. Hence, a multicast MPTS delivered by the video QAM 225 and/or CCAP 227 comprises at least the SPTS for the requested IP packetized content (in addition to other IP and non-IP content).

Next, per step 314, the gateway apparatus 202 joins the multicast group in order to receive the requested content as a multicast stream. In one embodiment, the content is received as an MPEG-2 transport stream. In other words, the MPEG-4 or other packetized content is encapsulated in MPEG-2. To accomplish such encapsulation, the QAM entity, or the edge streamer 204 (or in one embodiment the gateway 202) is configured to de-encapsulate the received Internet content from a first media file container format and subsequently re-encapsulate the Internet content to a second media file container format. One exemplary delivery paradigm comprises delivering MPEG-based video content (e.g., "IPTV" or the like), with the video transported to IP capable CPE 107 over the e.g., a DOCSIS channel (or other in-band channel) as MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels (such as e.g., MPEG 2 transport stream).

The gateway 202 next processes the received multicast per step 316 so that it may be delivered as a unicast to the requesting CPE 107. In one embodiment, the MPTS is processed at the gateway 202 by identifying the appropriate content using a program number (or MPEG PN) within the MPTS. As is known in the art, a program number is a unique value assigned to each program which allows each video stream to be enumerated from a group of streams, such as the MPTS.

Various other processing steps may be performed by the gateway at step 316. For example, the gateway apparatus 202 may transcrypt the content to provide content in an encryption scheme used by the requesting client 107, transcode to provide content in a codec used by the requesting client 107, and/or transrate the received content to generate a content stream which is in a suitable format for playback at the client device 107.

In one exemplary embodiment, content is converted from multicast to unicast at the gateway apparatus 202 via well-known network address translation (NAT). In other words, the gateway apparatus 202 receives the multicast and modifies IP address information in IP packet headers to reference a unicast delivery address. However, it is appreciated that other translation or processing methods may be used with equal success.

In yet another embodiment, multiple unicast streams are instantiated or identified from within an MPTS multicast. The individual unicast streams are then delivered to one or more devices which have requested the content. In addition, the MPTS may be used to provide alternative program streams such as e.g., "mosaics", or alternate angles of a primary stream. In addition, processing at the gateway 202 may further include modification of the HTTP Live Streaming (HLS) protocol to support persistent stream of non-adaptive video as discussed in the previously referenced co-owned, co-pending U.S. patent application Ser. No. 13/835,388 filed on Mar. 15, 2013 and entitled "APPARATUS AND METHODS FOR MULTICAST DELIVERY OF CONTENT IN A CONTENT DELIVERY NETWORK". As discussed therein, the use of the HLS protocol modification to provide a persistent stream of non-adaptive video is advantageous, in that the multicast from the network does not guarantee delivery or packet order; delivering the multicast in native MPEG2-transport stream addresses this problem.

Once the content is processed, it is provided to the requesting client 107 as a unicast stream from the gateway 202. Delivery may occur using e.g., Transmission Control Protocol (TCP), Real Time Streaming Protocol (RTSP)/Real Time Transport Protocol (RTP), WebSocket, etc. In the instance the gateway 202 utilizes the aforementioned WebSocket technology, the client device 107 runs a HyperText Markup Language (HTML) 5 capable video player (which is compatible with WebSocket) to play the received content. A detailed implementation of the present disclosure utilizing the aforementioned WebSocket technology is disclosed in the previously referenced co-owned U.S. patent application Ser. No. 13/835,388 filed on Mar. 15, 2013, entitled "APPARATUS AND METHODS FOR MULTICAST DELIVERY OF CONTENT IN A CONTENT DELIVERY NETWORK", and issued as U.S. Pat. No. 9,066,153 on Jun. 23, 2015, which is incorporated herein by reference in its entirety.

Still further, the gateway 202 may utilize a 5 second round-robin buffer to deliver the requested content as a unicast to the requesting device 107. In one variant, the gateway 202 stores the packets delivered into its 5 second round-robin buffer, and then, as discussed above, the gateway 202 breaks apart the multicast stream at the markers, and delivers the multicast packets as unicast to the client devices. In this manner, the gateway 202 is able to support delivery of all HTTP ABR streams (such as e.g., HLS, HSS, etc.) for all over the top service providers and their supported devices. In other words, the gateway 202 is agnostic to the service provider network and is not specific to any given MSO network.

The foregoing processing (step 316) further enables backward compatibility for video players that do not support multicast IP content delivery. Such compatibility is rendered possible via the above-described multicast-to-unicast translation at the gateway 202, which causes the content to be delivered to the requesting device 107 without any requirements or modifications thereto. Next, per step 318 of the method 300, the gateway apparatus 202 is used to facilitate delivery of the content via the multicast to devices 107 which were previously receiving the content as a unicast. That is, in the instance that various devices serviced by a node or gateway 202 were receiving Content A as a unicast delivered thereto, and it is determined (via the methods disclosed herein) that a multicast should be established for Content A, not only will the particular device which requested Content A (causing the multicast to be established) be provided with the multicast, but also those other devices which were previously receiving Content A are switched to the multicast version thereof.

The gateway 202 facilitates the aforementioned switch from unicast to multicast (step 318) via playlist/manifest file manipulation. More specifically, when a client requests a unicast video stream, the client first looks up a playlist and retrieves an elementary playlist and opens it for playback. It then requests the first MPEG2 transport .ts file (for example, "20120712T195912-01-42231.ts" may be requested), and starts rendering the contents on the client's display. The client pre-fetches subsequent .ts files for playback, one at each target duration (in one example, 11 seconds). Once the rendering of the previous .ts content has finished, the next .ts content in the prefetch buffer is rendered on the client's display and the process is repeated until the current playlist is exhausted. The client device refreshes the elementary playlist to get the next set of .ts files for playback when the current list is exhausted. In the instance that the client is viewing a live stream (i.e., content which is provided on a content channel according to a pre-determined schedule), additional elementary playlists are always available for playback.

Per step 318 of the method 300, the gateway 202 relieves the client from displaying .ts files associated with a unicast content stream, and from updating the unicast playlist. The gateway 202 instead creates a multicast stream with the same content having additional markers to indicate synchronization points in the packets which matches that of the packets in the unicast stream. The gateway 202 manipulates the one or more elementary stream playlists relating to requested content in order to transition the device from a unicast to a multicast delivery stream. The synchronization of the multicast stream with the current unicast stream uses markers within the content streams to re-generate the currently delivered unicast packets. At the same time, the gateway 202 utilizes a 5 second round-robin buffer to store the reconstituted unicast packets. Once synchronization is reached and the round-robin buffer has reached a high watermark, the gateway 202 stops forwarding the next .ts and playlist requests from the client to the network, and instead services the requests directly from the multicast stream.

As discussed above, each stream is portioned into a plurality of segments. In one exemplary embodiment, segmentation and identification of particular segments is performed using the methods and apparatus disclosed in co-owned, co-pending U.S. patent application Ser. No. 13/333,444 filed on Dec. 21, 2011 and entitled "ADAPTIVE BIT RATES IN MULTICAST COMMUNICATIONS", which is incorporated herein by reference in its entirety. The URLs contained in the variant playlist point to a stream playlist, which contains URL of the different stream segments. An example of a playlist is given below:

EXTM3U
EXT-X-VERSION:3
EXT-X-TARGETDURATION:11

```
#EXT-X-MEDIA-SEQUENCE:42231
#EXTINF:10.01,
20120712T195912-01-42231.ts
#EXTINF:10.01,
20120712T195912-01-42232.ts
#EXTINF:10.01,
20120712T195912-01-42233.ts
#EXTINF:10.01,
20120712T195912-01-42234.ts
#EXTINF:10.01,
20120712T195912-01-42235.ts
```
©Copyright 2013 Time Warner Cable, Inc. All rights reserved.

For convenience, the URL contained in the stream playlist may be referred to herein as a "segment URL". A segment URL may also contain the protocol and full path; for example: "http://www.timewarnercable.com/video/channel1/20120712T195912-01-42231.ts".

As discussed above, the gateway 202 causes one or more URL of unicast streams to be replaced or coexist with, URL of multicast streams. For example, given the following set of available unicast streams:

```
#EXTM3U
#EXT-X-STREAM-INF:PROGRAM-ID=1,BAND-
   WIDTH=929472,RESOLUTION=640×480,
   CODECS="avc1.4d401e,mp4a.40.5"01.m3u8
#EXT-X-STREAM-INF:PROGRAM-ID=1,BAND-
   WIDTH=1648384,RESOLUTION=720×480,
   CODECS="avc1.4d401e,mp4a.40.5"02.m3u8
#EXT-X-STREAM-INF:PROGRAM-ID=1,BAND-
   WIDTH=3188480,RESOLUTION=1920×1080,
   CODECS="avc1.4d4028,mp4a.40.5"udp://
   239.100.0.1:5000
```
©Copyright 2013 Time Warner Cable, Inc. All rights reserved.

In the above example, the gateway 202 may replace the third unicast stream URL (which has the highest bitrate and quality) with a multicast stream URL that has the same content as the unicast stream. Optionally, the source IP address may also be added to the end of line after the udp://multicastIPAddress:port for IGMP V3 support.

Replacing the unicast stream of highest bitrate with the same quality multicast stream as disclosed herein, results in most network bandwidth saving, since now the stream that has the highest bitrate can be shared by many viewers. However, on some of the network segments, most viewers elect to receive a stream that does not have the highest bitrate due to overall network congestions. The playlist file(s) are generated dynamically according to the network conditions. As noted above, the streams that are requested most are put to multicast mode to maximize the bandwidth saving effect. There can be multiple multicast streams on the playlist. Network conditions on different segments of network can be different; hence viewers on different segments of network may get different playlist files that are customized for their network conditions. When network condition changes, dynamically generated playlist files or change (see e.g., discussion of FIG. 3b below). This is the stream layer replacement. This alone can adjust the bandwidth required for video streams, hence improve the quality of service and viewing experience.

In order to switch to from a first stream for requested IP packetized content to second stream of the same content seamlessly, the gateway 202 must determine a current stream location of the video player (e.g., CPE 107). In order to accomplish this, the streams are processed into segments; each segment is labeled and identified. Although it is not necessary to segment multicast streams, segment identification is in one embodiment also included for multicast streams so as to facilitate stream switching from Multicast to Unicast (see discussion of FIG. 3b below).

Figure 4A:
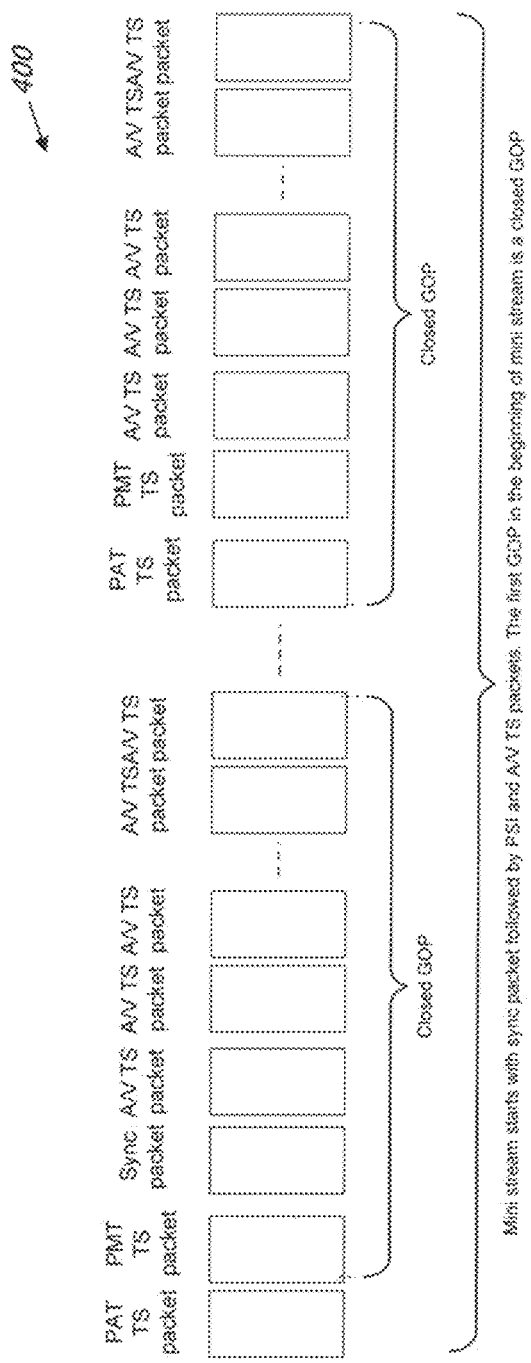
FIG. 4a is a schematic representation of an exemplary transport stream with segment identification for use in providing hybridized IP packetized content delivery according to the present disclosure.

When MPEG2 transport is used as transport protocol, the segment identification information is included in an MPEG2 private data section and then encapsulated to MPEG2 transport packets as a data stream. The segment identification packets have a unique packet identifier (PID). The PID is included in the same program map table (PMT) as the audio and video PIDs, so that the data stream is in the same MPEG program as the audio and video streams. The data stream PID is identified by special stream descriptor(s). One or more segment identification packets (also called sync packets) are inserted to the beginning of each of the video segments. An example of transport stream 400 with segment identification is shown in FIG. 4a.

The synchronization packet can be inserted to video segments of multicast stream, and to the video segments saved on the origin/edge servers to make the unicast and multicast streams identical. Since the synchronization packets uses a unique PID, it is ignored by the video players that do not support it. The behavior of a normal unicast ABR video player will not be negatively affected because of the insertion of synchronization packets.

The gateway 202 maintains and/or accesses the playlist in order to identify which stream the CPE 107 is currently playing. When the CPE 107 is playing the HTTP unicast stream, the gateway 202 is able to identify the precise segment currently playing. The only identification information that needs to be inserted to the multicast stream is the segment URL. In the above example, when the first HTTP stream in the HLS variant playlist is replaced with a multicast stream, the corresponding segment URL (20120712T195912-01-42231.ts, 20120712T195912-01-42232.ts . . . ) is encapsulated to MPEG-2 transport packet(s) and inserted to the beginning of each segment.

Current segment identification information (URL) is constantly recorded and updated by e.g., the CPE 107 and/or the gateway 202. For various processing reasons discussed elsewhere herein, in one exemplary embodiment, multiple segment URL are recorded (such as e.g., to support time-shifted viewing, to facilitate seamless transitioning, etc.).

Each the unicast streams are able to coexist with a multicast stream of same profile in the same playlist file. In the instance the video player device 107 supports multicast streams, they can be played directly. Alternatively, as discussed with respect to step 316 above, the gateway 202 may process the multicast streams to a format capable of being rendered by the device 107. An example of variant playlist with multicast streams coexist with the unicast stream is shown below:

```
#EXTM3U
#EXT-X-STREAM-INF:PROGRAM-ID=1,BAND-
   WIDTH=929472,RESOLUTION=640×480,
   CODECS="avc1.4d401e,mp4a.40.5"01.m3u8
#EXT-X-STREAM-INF:PROGRAM-ID=1,BAND-
   WIDTH=3188480,RESOLUTION=1920×1080,
   CODECS="avc1.4d4028e,mp4a.40.5"udp://
   239.100.0.1:5003
#EXT-X-STREAM-INF:PROGRAM-ID=1,BAND-
   WIDTH=3188480,RESOLUTION=1648384×1080,
   CODECS="avc1.4d4028e,mp4a.40.5"udp://
   239.100.0.1:5002
```

EXT-X-STREAM-INF:PROGRAM-ID=1,BAND-
WIDTH=3188480,RESOLUTION=1920×1080,
CODECS="avc1.4d4028e,mp4a.40.5"udp://
239.100.0.1:5001
EXT-X-STREAM-INF:PROGRAM-ID=1,BAND-
WIDTH=3188480,RESOLUTION=1920×1080,
CODECS="avc1.4d4028e,mp4a.40.5"03.m3u8
EXT-X-STREAM-INF:PROGRAM-ID=1,BAND-
WIDTH=3188480,RESOLUTION=1920×1080,
CODECS="avc1.4d4028e,mp4a.40.5"udp://
239.100.0.1:5003
©Copyright 2013 Time Warner Cable, Inc. All rights reserved.

Per step 318, and as indicated above, the switch from unicast to multicast requires segmentation of the IP packetized content. Segment markers are added to a content stream by an encoder/transcoder. When a stream is encoded/transcoded, encoder/transcoder conditions the segment boundary so that segments start and end with closed GOP. At the same time, encoder/transcoder also adds segment marker to the beginning of segment, immediately following the program association table (PAT) and/or program map table (PMT). For example, segment markers as defined by American National Standards Institute/Society of Cable Telecommunications Engineers specification ANSI/SCTE-35 2007 entitled "Digital Program Insertion Cueing Message for Cable", which is incorporated herein by reference in its entirety, may be utilized. Other segment marker types may be utilized with equal success as well (e.g., those used in OpenCable® ETV specification OC-SP-ETV-AM-1.0406-110128 entitled "Enhanced TV Application Messaging Protocol 1.0", which is incorporated herein by reference in its entirety).

Figure 4B:
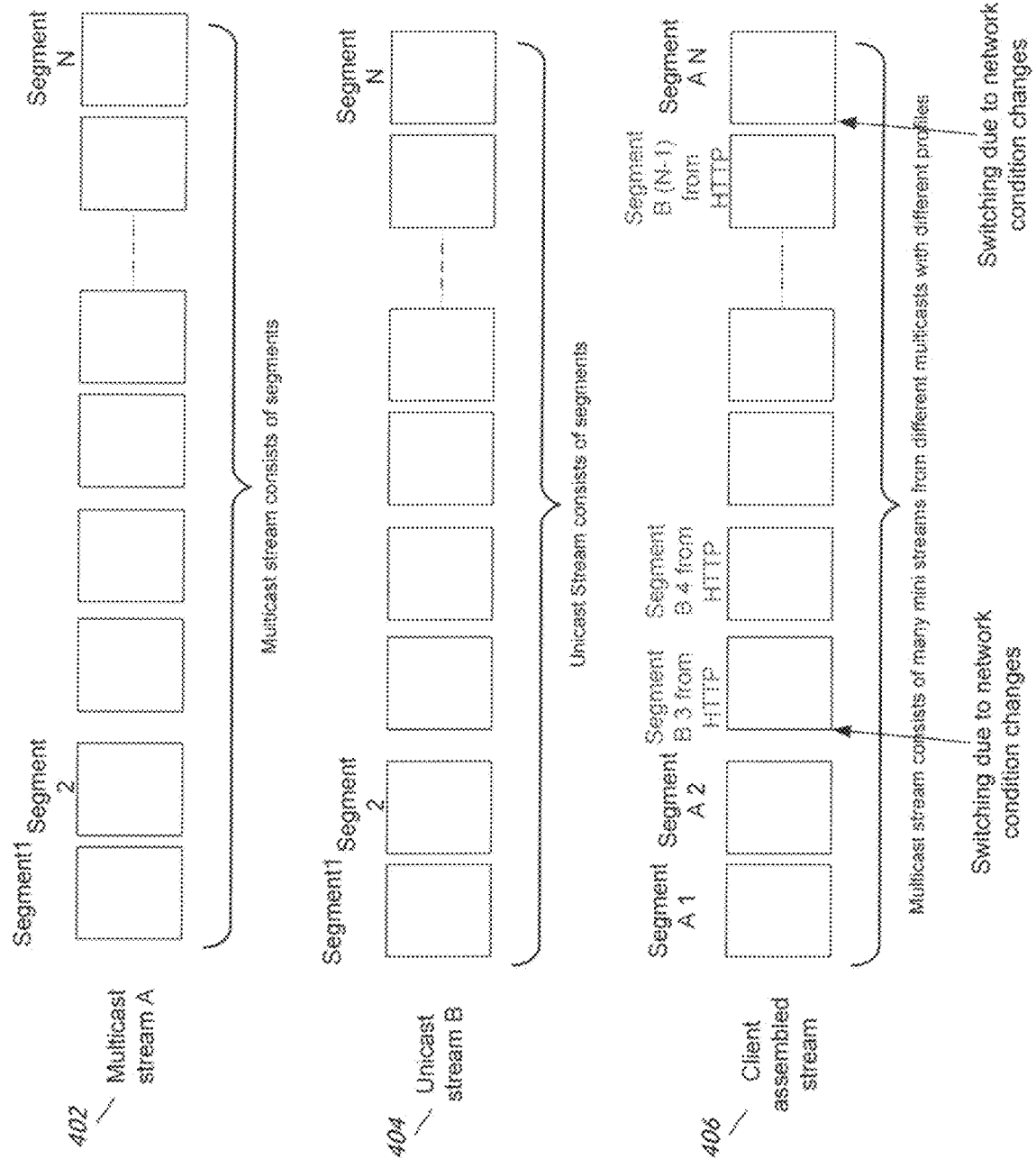
FIG. 4b is a schematic representation of an exemplary assembled video buffer for use in providing hybridized IP packetized content delivery according to the present disclosure.

FIG. 4b illustrates an exemplary assembled video buffer 406 after a switch occurs (due to network condition change, transmission error conditions, scheduled change over events, etc.). Although illustrated as a multicast to unicast switch, it is appreciated that the herein described logic applies equally to a unicast to multicast switch, the illustration of FIG. 4b is merely exemplary.

As shown, the multicast stream A 402 comprises various segments (Segment 1, Segment 2 . . . Segment N). The unicast stream B 404 also comprises various segments (Segment 1, Segment 2 . . . Segment N). In the given example, the content represented by the multicast stream A 402 and the unicast stream B 404 is the same, and it is determined that (based on current playback locations) a switch from the multicast stream A 402 to the unicast stream B 404 will occur at segment 3. Hence, as shown by the assembled stream 406, the first and second segments are provided from the multicast stream A 402 (thus designated as Segment A1 and Segment A2, respectively), the third segment (Segment B3) and beyond are pulled from the unicast stream B 404.

In the exemplary embodiment of FIG. 4b, as the play out progresses, a second switching event occurs at segment N. Accordingly, content segment N-1 is pulled from the unicast stream B 404, and the subsequent segment (segment N) is pulled from the multicast stream A 402 in much the same way as described above.

The various switching operations which occur according the present disclosure are ideally transparent to the CPE 107. In other words, the client is never made aware that it is not getting the exact bits of the file segments they request. Rather, requests for the contents of a particular file are re-routed by the gateway and, where deemed appropriate are re-written to a multicast or unicast request (such as by simply re-writing the incoming stream between the file segment markers). The mechanisms disclosed herein create a continuous or seamless stream of the segment that the client expects to receive and buffer.

Figure 3B:
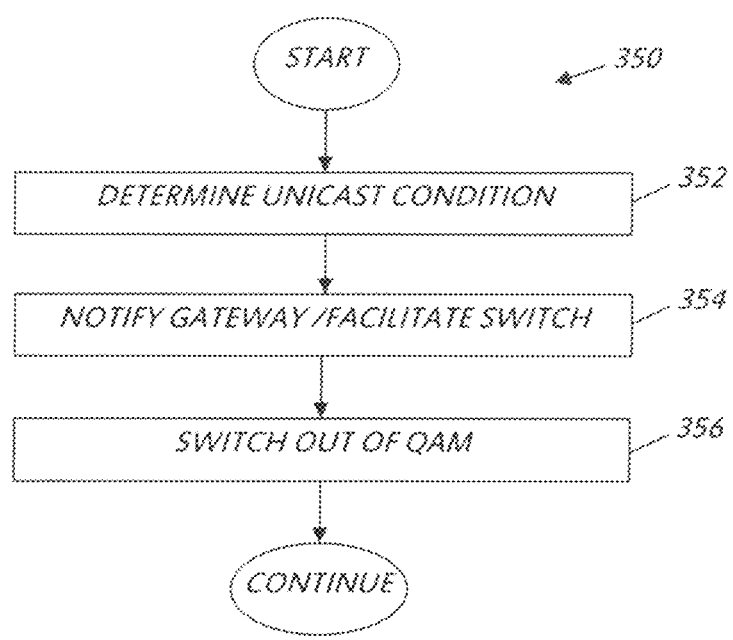
FIG. 3b is a logical flow diagram illustrating a second exemplary embodiment of a generalized method for providing hybridized IP packetized content delivery according to the present disclosure.

Referring now to FIG. 3b an exemplary method 350 for tearing down an established multicast stream for particular IP packetized content is given. Per step 352, network and/or program-specific conditions are identified which cause the system to determine that a multicast is no longer appropriate. The conditions may include e.g., changes in available network capacity (i.e., bandwidth allocated to multicast IP use), popularity of a particular program, transmission errors detected (see discussion below), etc. In one variant, the decision is made by a software application at the edge server 204 based on information received from one or more service node entities and/or gateway 202 in communication therewith.

When this occurs, per step 354, the gateway 202 is notified that the video QAM 225 and/or CCAP 227 will no longer carry the multicast stream. The gateway 202 use this advance warning to facilitate switching of the client devices where appropriate (step 356) in a similar manner to that discussed above with respect to step 318 of FIG. 3a. In other words, the multicast and unicast packets are synchronized once more, before the multicast stream is taken down by the system.

Once the gateway has unjoined the multicast (via the aforementioned switching), per step 358, the video QAM 225 and/or CCAP 227 switch the SPTS for the identified content out of delivery in the MPTS.

In the event the condition change relates to a transmission error, it is appreciated that the determination of step 352 occurs at the gateway 202 in response to an error reported ore perceived by the CPE 107. In addition, the video QAM 225 and/or CCAP 227 may optionally not perform step 356 (as necessary).

Exemplary Switching Implementations

As discussed throughout the present application, when the gateway 202 and/or edge device 204 (which support the disclosed hybrid solution) detect network/CPU resource changes, changes in available network capacity (i.e., bandwidth allocated to multicast IP use), popularity of a particular program, transmission errors detected (see discussion below), etc., a switch to another unicast/multicast stream contained in the playlist is triggered.

Various embodiments of exemplary switching scenarios are provided below. It is noted that, in the given examples, all of the streams are of same content, and in one embodiment comprise different profiles (resolution, bitrate). It is additionally noted that unicast video segments may be saved on the content server/CDN 101 for a short period of time (determined by the network operator); in one variant multicast stream segments are not saved. Furthermore, it is noted that it may be desirable to provide the multicast stream slightly delayed relative to the unicast stream in order to achieve seamless switching between the multicast and unicast streams.

Scenario 1: Switch from a Multicast Stream A to Unicast Stream B

In this example, the client device (or video player) 107 leaves multicast A. Using the segment identification information included in the multicast stream A, the gateway apparatus 202 or video player 107 identifies the last good segment from multicast stream A, and then uses an HTTP GET request to request the next (and subsequent) segments of stream B from the HTTP content server.

Scenario 2: Switch from Multicast A to Multicast B

In this example, the client device (or video player) 107 leaves multicast A. Using the segment identification information included in the multicast stream A, the gateway 202 identifies the last good segment from multicast stream, and then uses an HTTP GET request to request the next few (1 or more) segments of multicast stream B from the HTTP content server. The gateway 202 simultaneously joins the multicast stream B. Video segments from unicast stream B and multicast stream B are ordered and merged, duplicated segments dropped, to form a contiguous stream in video player decoding buffer. Video player stops making unicast HTTP requests (via a re-writing process at the gateway 202) once it can receive all segments from multicast stream B.

Scenario 3: Switch from Unicast A to Multicast B

In this example, the gateway 202 gets the segment identification from the playlist file, and switches so as to get segments from multicast stream B from HTTP server. The gateway 202 also joins the multicast stream B. Video segments from unicast stream B and multicast stream B are ordered and merged, duplicated segments dropped, to form a contiguous stream in video player decoding buffer. Video player stops making unicast HTTP requests (via a re-writing process at the gateway 202) once it can receive all segments from multicast stream B.

Scenario 4: Switch from Unicast A to Unicast B

It is noted that a switch from a first unicast stream to a second unicast stream will occur according to well-known methods in the current unicast ABR solution and will not be discussed in further detail herein.

Edge Streaming Device 204

Figure 5:
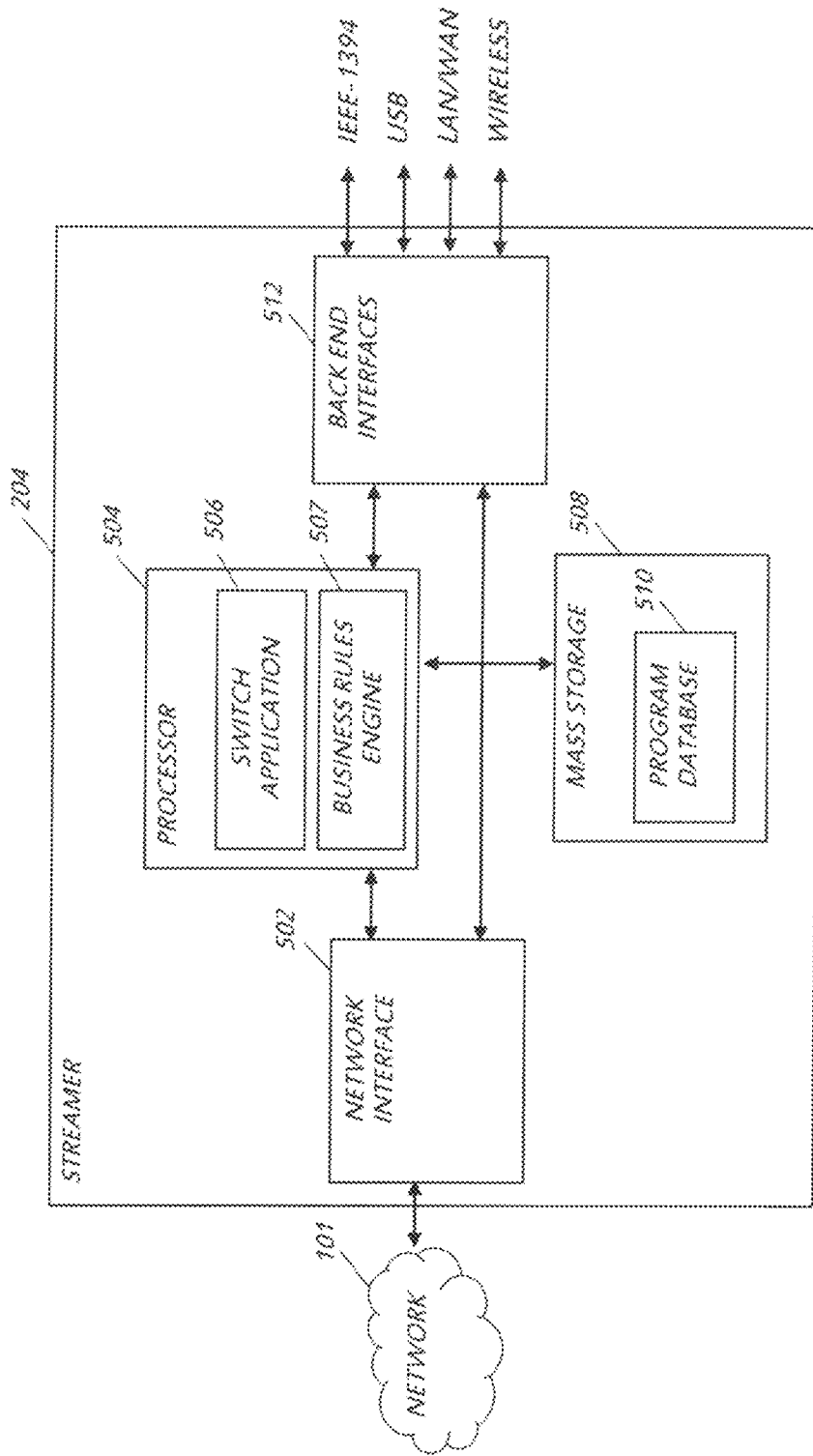
FIG. 5 is a functional block diagram illustrating one embodiment of an edge device for use in delivering hybridized IP packetized content to subscribers according to the present disclosure.

Referring now to FIG. 5, an exemplary embodiment of an edge streamer (or ABR streamer) 204 is illustrated. As shown, the streamer 204 generally comprises a network interface 502 for communication with the content delivery network 101, and various backend interfaces 512 for communication to other entities (not shown).

As discussed previously herein, the exemplary embodiment of the edge device 204 is configured to communicate via the aforementioned interface 502 with the gateway 202, the IP CPE 107 (via the gateway 202 in one embodiment), video QAM 225 and/or CCAP 227, and other CDN 101 entities. In particular, the edge device 204 requests content from an origin server 221 for processing thereof in order to incorporate the received content into SPTS for transmission to the video QAM 225 and/or CCAP 227.

The instant edge device 204 further comprises a processor 504 and associated storage 508. As shown, the processor is configured to run at least an switch application 506 and an operational/business rules engine 507.

The switch application 506 enables the edge device 204 determine whether requested content is provided via a multicast, cause the video QAM 225 and/or CCAP 227 to add or remove identified content to a multicast, and otherwise monitor network conditions and requests for content. The aforementioned determination may occur via evaluation of requests received from the client devices 107, pre-stored operator determined rules, evaluation of network conditions, etc. The switch application 506 creates and dynamically updates a database 510, which contains a list of content available for multicast delivery. The list is in one embodiment provided to the gateway 202 and/or client 107 for determinations as to whether to join a multicast at the time a request for content is made. As shown, the database 510 may be stored at the mass storage 508 of the edge device 204; alternatively the database may be located remote to yet in communication with the device 204.

The operational/business rules engine 507 enables the edge device 204 to define rules for determining when to cause a content to be provided as a multicast. In one embodiment, the rules engine 507 clocks a number of times devices 107 request particular content (or sequences/collections of multiple content elements). When the number reaches a pre-determined threshold, the switch application 506 causes a multicast to be created, and an identifier of the content is added to the database 510. The video QAM 225 and/or CCAP 227 entities are then charged with adding the content to a multicast. The threshold may be based on a number of requests over a given period of time, and/or may be based on a service area within which the requests are received. Other mechanisms for determining popularity of requested content may be used as well.

The operational/business rules engine 507 performs similar steps as indicated above to identify and remove content which no longer meets the requirements for multicast distribution thereof (such as when a number of requests for the content is below a given threshold).

Additionally, the determination of whether to add or remove content to/from mulicast delivery may be based on e.g., user designated so-called "favorite channels", most recently watched content history, and/or other live events criteria.

In another embodiment, the functionality of a recommendation engine such as e.g., that disclosed in co-owned U.S. Patent Application Publication No. 2009/0193485 filed on Jan. 30, 2008, entitled "METHODS AND APPARATUS FOR PREDICTIVE DELIVERY OF CONTENT OVER A NETWORK", and issued as U.S. Pat. No. 9,060,208 on Jun. 16, 2015, which is incorporated herein by reference in its entirety, is provided at the edge device 204 or other entity in communication there with, and is utilized in conjunction with the rules engine 507 to predict content for multicast delivery. As discussed therein, historical viewing or use information derived from the network is maintained and analyzed. In the previously referenced application, this information used to fill the bandwidth that is not currently being consumed via consumer requests with programming that is predictively selected. Applying those principles to the present disclosure, the information regarding historical viewing/use may be applied to identify content which is predicted to be in high demand. Such content may then be selected by the rules engine 507 to be provided as a multicast within the operator-allotted IP multicast bandwidth.

Gateway Device

Figure 6:
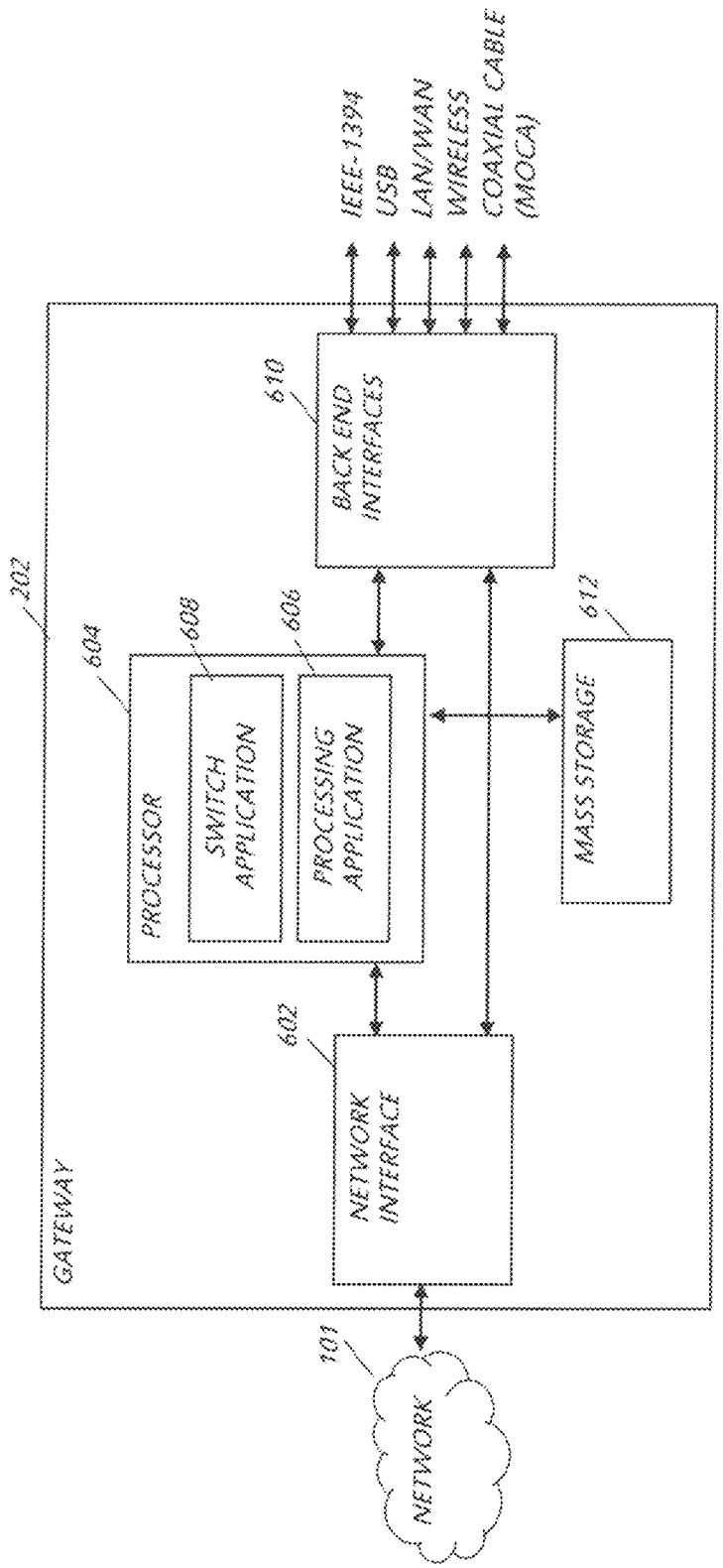
FIG. 6 is a functional block diagram illustrating one embodiment of a gateway device for use in delivering hybridized IP packetized content to subscribers according to the present disclosure.

Referring now to FIG. 6, one exemplary embodiment of the gateway device 202 is illustrated. As shown, the gateway device 202 comprises a network interface 602, processor 604, mass storage 612, and backend interfaces 610.

The network interface 602 in one embodiment comprises a cable modem, such as e.g., a DOCSIS 3.0 compliant cable modem of the type discussed in "DOCSIS® 3.0 Management Features Differences Technical Report" CM-TR-MGMTv3.0-DIFF-V01-071228 and "DOCSIS 3.0 OSSI Configuration Management Technical Report" CM-TR-OSSIv3.0-CM-V01-080926, each of which is incorporated herein by reference in its entirety. The cable modem provides DOCSIS connectivity to the IP CPE 107 to be used for network communication (such as communication with the video QAM 225 and/or CCAP 227, the edge device 204, etc. as previously described), as well as various other purposes (such as VOD, Internet "surfing", interactive program guide (IPG) operation, etc.). In an alternative embodiment, the IP CPE 107 may communicate directly with the headend or other entities.

The network interface 602 of the gateway device 202 further comprises one or more QAM tuners configured to receive content from the HFC network 101. The RF tuner(s) may comprise traditional video RF tuner(s) adapted to receive video signals over, e.g., a QAM. For example, the RF tuner(s) may comprise one or more tuners, a demodulator, decryption module, and demultiplexer of the type well known in the art, although other configurations may be used. The number and type of QAM tuners utilized in the gateway device 202, as noted above, may be varied so as to ensure tuning across the entire available spectrum. Alternatively, different classes of devices may be provided each class having a different tuning range capability.

For example, the gateway 202 may include a wide band tuner, such as that discussed in co-owned, co-pending U.S. Patent Application Publication No. 20060130113 filed on Dec. 15, 2004, and entitled "METHOD AND APPARATUS FOR WIDEBAND DISTRIBUTION OF CONTENT". The wideband tuner arrangement enables the gateway 202 to receive content associated with one or more program streams distributed across two or more QAMs. Additionally, the RF tuner(s) may incorporate functionality to modulate, encrypt/multiplex as required, and transmit digital information for receipt by upstream entities such as the CMTS. The tuners may additionally be capable of tuning across the entire band of QAM channels such as those developed by e.g., Texas Instruments and Broadcom.

The gateway device 202 can assume literally any discrete form factor, including those adapted for settop/desktop, hand-held, or wall-mounted use, or alternatively may be integrated in whole or part (e.g., on a common functional basis) with other devices (such as the IP CPE 107) if desired. Additionally, the gateway device 202 may include other elements and interfaces such as for example an interface for the HomePlug A/V standard which transmits digital data over power lines, WiFi capability, a PAN (e.g., 802.15), Bluetooth, or other short-range wireless interface for localized data communication, etc.

The gateway 202 processor 604 is configured to run a processing application 606 and a switch application 608 thereon. The processing application 606 and switch application 608 enable the gateway 202 to perform the processing and playlist manipulation required to switch an IP CPE 106 to and from a multicast as well as to display the received content (as discussed above with respect to steps 316 and 318 of FIG. 3a). In one variant processing may include de-encapsulating the received internet content from a first media file container format and subsequently re-encapsulating the internet content to a second media file container format, transcription, translation, and/or transcoding. In one exemplary embodiment, content is converted from multicast to unicast via network address translation by the processing application 606.

Communication between the gateway 202 and the client devices 106 and 107 occurs via the backend interfaces 610. As noted previously, such communication may utilize e.g., IEEE 1394, USB, LAN/WAN, wireless, and/or MOCA communications protocol with equal success.

Various options may be utilized to protect content as it is transmitted to the gateway device 202 and on to the IP CPE 107. In one embodiment, the video QAM 225 and/or CCAP 227 is configured to rotate a common key for a multicast. Alternatively, this may be provided at e.g., the origin server 221 and/or edge device 204. Signals transmitted to the gateway 202 which include key updates are flagged (such as by a TS header). Receipt of these flags at the gateway 202, triggers the gateway 202 to pull the corresponding key from a key server via an authenticated HTTPS. The gateway 202 can then transcript content from multicast to unicast (as discussed above) via the key. In addition, the gateway 202 may store client/session specific keys for use during playback.

In another variant, the gateway 204 can be configured to use one tuner and associated digital processing chain to receive and encapsulate a first stream destined for one multicast address (and associated IP CPE 107), while using a second tuner to receive an already IP-encapsulated stream, such as via a normal DOCSIS QAM or the like. Hence, the gateway can act as a hybrid "switched" IPTV/non-switched IP device for multiple CPE in the premises.

Still further, the gateway 202 may provide IP content to legacy (i.e., non-IP capable) devices (such as CPE 106). For example, in one embodiment, the gateway apparatus 202 may be of the type discussed in co-owned U.S. Patent Application Publication No. 2011/0093900 filed on Oct. 20, 2009 and entitled "GATEWAY APPARATUS AND METHODS FOR DIGITAL CONTENT DELIVERY IN A NETWORK", which issued as U.S. Pat. No. 9,027062 on May 5, 2015 and is incorporated herein by reference in its entirety. As discussed therein, internet (or IP packetized) content is de-encapsulated from a first media file container format and subsequently re-encapsulating to a second media file container format which is compatible with one or more receiving devices. For example, content which is delivered from a host server may be encapsulated in e.g., MP4, if the receiving client device(s) are not capable of reading the MP4 files, the gateway device 202 may re-encapsulate to e.g., MPEG-2 or other format that the receiving device is capable of reading. The gateway device 202 may process received content automatically into various alternative encapsulation formats or, may encapsulate as needed to the format of the specific requesting device. The processed content may also be stored at the gateway 202 or other data storage (whether at the premises or network) for future use for transmission to other client devices requesting the same content in the particular new format.

Exemplary User Device

Figure 7:
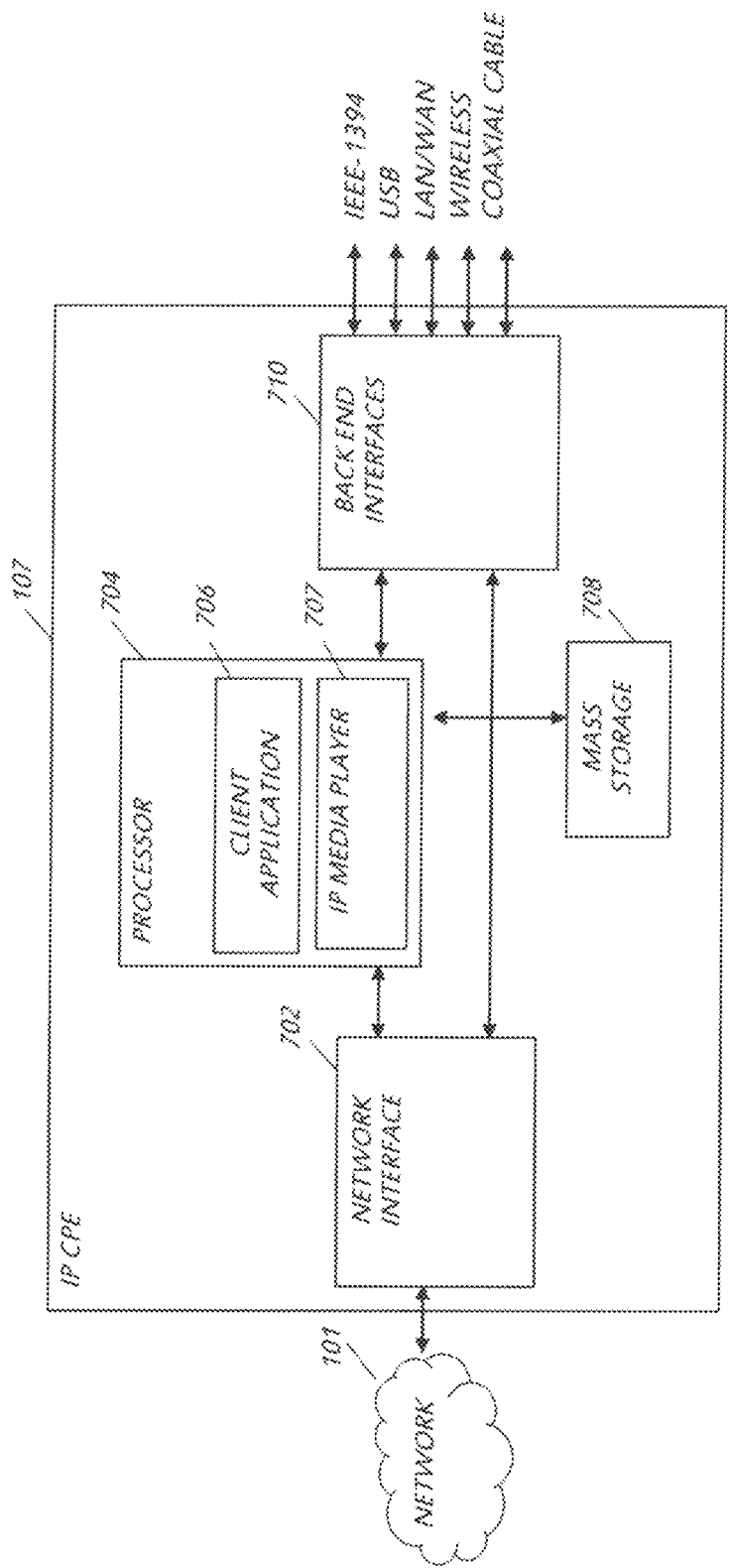
FIG. 7 is a functional block diagram illustrating an exemplary embodiment of an IP enabled CPE according to the present disclosure.

An exemplary IP capable user device (or CPE) 107 useful with the present disclosure is illustrated in FIG. 7. The IP-capable CPE 107 may comprise any device capable of receiving and decoding IP packetized content, whether for display thereon, or for recording, display, or storage on a device in communication therewith. Exemplary devices include IP-enabled settop boxes, IP-enabled television sets, laptop and desktop computers, and even cellular smartphones, personal media devices (PMD), etc. In one exemplary embodiment, the IP-capable CPE 107 is compatible with Digital Living Network Alliance (DLNA) standards for consumer electronics (such as those discussed in DLNA Interoperability Guidelines, version 1.5, published March 2006 (expanded October 2006), which is incorporated herein by reference in its entirety) for signaling purposes, and also makes use of a digital rights management (DRM) content protection scheme to comply with limitations on certain content, or provide authorization credentials with respect to protected content.

As shown in FIG. 7, the IP CPE 107 generally includes e.g., a network interface 702, a processor 704 and associated storage 708, and optionally a plurality of back end interfaces 710 for communication with other devices.

The network interface 702 enables communication between the IP CPE 107 and the network 101 (and/or gateway 202, edge device 204, etc., as applicable). One or more of the backend interfaces 710 are used for communication with other linked devices. In one embodiment, the backend interface 710 (and not the network interface 702) is used for communication between the IP CPE 107 and the gateway 202. Since the content being passed between the two devices is IP encapsulated, and only relatively low overhead communications between the IP CPE 107 and the gateway 202 are needed to support the functionality described herein, the interface between the two devices can literally assume any form, including wired and wireless.

The IP CPE 107 processor 704 is configured to load and run a media player 707, such as an HTML5 video player, in order to play the received content. The media player 707 in one embodiment is compatible with the aforementioned WebSocket protocol, however as indicated throughout the present disclosure WebSocket compatibility is not required as the present disclosure provides a protocol agnostic mechanism for providing IP packetized content. DRM and/or Conditional Access (CA) functionalities may also be implemented and supported at the media player 707.

In one embodiment, restrictions (if any) to the provision of content to a user at a display or rendering device associated with the user device are determined by the device (e.g., IP CPE 107, etc.) itself, as discussed in co-owned, co-pending U.S. Patent Application Publication No. 2011/0219229 filed on Mar. 2, 2010 and entitled "APPARATUS AND METHODS FOR RIGHTS-MANAGED CONTENT AND DATA DELIVERY", which is incorporated herein by reference in its entirety. As discussed therein, a downloadable or transferable rights profile coupled with a "smart" media player application are given. The rights profile contains information regarding the specific rights of a device and/or a subscriber to access content. It is via the rights profile that the device (via the media player and its associated rights management application) determines whether to provide content to a subscriber, and/or what restrictions or privileges to apply. Hence, in the present context, the MSO might generate a rights profile and pass this profile (or information indicating which of a plurality of pre-positioned profiles to apply) to the gateway device 202 for transmission to the smart media player 707 on the client device 107.

The processor 704 also runs an IP client application 706 for requesting unicast content, and receiving in return either the unicast or multicast thereof. As noted elsewhere herein, no changes to the functionality of a client device 107 are needed to provide the hybridized content delivery. Hence, the IP client application 706, in one embodiment, always requests unicast IP content and is never made aware that it is receiving a multicast (at the gateway 202) instead. Rather, requests are routed to the gateway 202 and, where deemed appropriate, re-written to a multicast or unicast request (such as by simply re-writing the incoming stream between the file segment markers). The device 107 is unaware that it is not getting the exact bits of the file segments it requests in this instance.

In yet another embodiment, the IP CPE 107 further comprises a hard drive in communication therewith or integrated therein which acts as a digital video recorder (not shown).

CCAP Implementation

In the instance the CCAP 227 is used to provide the IP multicast on a QAM channel, it is appreciated that bonded channel DOCSIS QAMs may be stacked to provide additional statistical multiplexer efficiency. According to this embodiment, the statistical multiplexer collects statistic bandwidth usage data for each program within multiplexer and feeds the data to the encoder/transcoder so that the content is encoded at the highest quality it can within the available bandwidth. Additionally, more bandwidth may be statistically assigned to the programs which need it (e.g., sports programs, etc).

Error Recovery

During delivery of a multicast, one or more errors may be encountered. Unlike the ABR unicast delivery of IP content, multicast is a one-way streaming protocol and there is no cache to rely on for retransmission in traditional multicast models. In the present disclosure, however, the segment identification information may be inserted to the multicast stream and used to identify a last good transmission of video segment. In case of transmission error, the gateway 202 uses this identification information to request the correspondent video segment(s) from the HTTP server or other local cache (or in a round-robin buffer of the gateway 202, or client device 107 if applicable). In this manner, sparse multicast transmission errors are recovered by replacing the error segments with corresponding error-free ones. The previously disclosed mechanism for switching between multicast streams (and switching back to the multicast) is then used to fully synchronize video segments from different streams and make a seamless transition.

Trick Mode Operation

Trick modes may be supported, in one variant, using a buffer at the client 107. Alternatively, an application running on the gateway 202 may be utilized to enable trick mode functions. In either instance, the buffer enables a viewer at the client device 107 to stop, pause, rewind, play, fast-forward, etc. streamed IP content. In one embodiment, this is accomplished by caching a portion of a content stream at the buffer, when a trick mode is requested by a viewer (such as via a button press at a remote control apparatus associated with the client device 107 or a display device in communication therewith), it is first determined whether the requested function is available for the particular content and/or by the particular device. It is appreciated that various business rules may be implemented by the gateway 202 and/or client 107 to ensure that only devices which have established with the network 101 a right to access trick mode functionality are given access thereto. For example, certain subscribers may purchase rights to a service level that includes the ability to perform trick mode operations. The foregoing business rules may alternatively or in addition be implemented to ensure that only content which is designated as being available for trick mode operations is provided with trick mode capabilities. In other words, certain content sources may designate their content as unavailable for trick mode operation. Trick modes are disabled by causing the buffer not to buffer the content.

Bitrate and Quality Decisions

As noted above, the present disclosure utilizes a playlist/manifest file. In the example given below, URLs of streams of different bitrate/quality of the same content are included in a given playlist file:

EXTM3U
EXT-X-STREAM-INF:PROGRAM-ID=1,BANDWIDTH=929472,RESOLUTION=640×480, CODECS="avc1.4d401e,mp4a.40.5"01.m3u8
EXT-X-STREAM-INF:PROGRAM-ID=1,BANDWIDTH=1648348,RESOLUTION=720×480, CODECS="avc1.4d4028e,mp4a.40.5"01.m3u8
EXT-X-STREAM-INF:PROGRAM-ID=1,BANDWIDTH=3188480,RESOLUTION=1920×1080, CODECS="avc1.4d401e,mp4a.40.5"03.m3u8
©Copyright 2013 Time Warner Cable, Inc. All rights reserved.

In the above example, the playlist file includes URLs of 3 video streams of different bandwidths and resolutions. In one embodiment (depending on available network, CPU resources, etc.) a particular client 107 may select a best quality stream it can handle from the playlist. Accordingly, the present disclosure may facilitate a subsequent switch to a stream of higher bitrate and/or quality when network/CPU resources improves, and a switch to a stream of lower bitrate and/or quality when network/CPU resources deteriorate.

In an alternative embodiment, the ability to switch between profiles is disabled. Given the overall resilience of the herein disclosed hybrid system, variant playlists (having different available versions of the same content at different bitrate/qualities) may be unnecessary and/or undesirable. Accordingly in this embodiment, the present system (e.g., gateway 202 or edge device 204) is configured detect the device type of the client and rewrite the variant playlist to restrict the elementary stream for just the profiles that matches the desired quality and viewer experience of the service provider to prevent displays of "pixilated" or otherwise low quality videos. An example of a re-written variant playlist is disclosed below (where items shown with strikethrough are removed by the gateway 202 or edge device 204):

EXTM3U
EXT-X-STREAM-INF:PROGRAM-ID=1,BANDWIDTH=3188480,RESOLUTION=1920×1080, CODECS="avc1.4d401e,mp4a.40.5"03.m3u8
©Copyright 2013 Time Warner Cable, Inc. All rights reserved.

Many other approaches and combinations of various operational and business paradigms are envisaged consistent with the present disclosure, as will be recognized by those of ordinary skill when provided this disclosure.

It will be recognized that while certain aspects of the present disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the ideas set forth herein. The foregoing description is of the best mode presently contemplated of carrying out the disclosure. This description is in no way meant to be limiting, but rather should be taken as illustrative of the general principles of The scope of the disclosure should be determined with reference to the claims.

What is claimed is:

1. A computerized method providing digitally rendered content over a network having a plurality of users associated therewith, the computerized method comprising:

receiving data representative of a request from a computerized client device in data communication with the network, the data representative of the request indicating particular digitally rendered content, the digitally rendered content packetized using at least an Internet Protocol (IP);

determining whether an appropriate multicast stream comprising the packetized digitally rendered content exists;

based at least on the determining indicating that the appropriate multicast stream comprising the requested packetized digitally rendered content does not exist:

creating a new multicast stream for delivery of the requested packetized digitally rendered content to the computerized client device via a new multi-program transport stream (MPTS);

causing the computerized client device to join the new multicast stream via receipt of the new MPTS; and identifying and re-formatting the requested packetized digitally rendered content from the new MPTS into a format capable of being utilized by the computerized client device; and causing delivery, via the new MPTS, of the packetized digitally rendered content to the computerized client device.

2. The computerized method of claim 1, wherein the creating of the new multicast stream is at least partly based on determining that a destination Internet Protocol (IP) address associated with the packetized digitally rendered content comprises an IP address associated with a known third-party data server in data communication with the network.

3. The computerized method of claim 1, wherein the determining of whether the appropriate multicast stream comprising the packetized digitally rendered content exists comprises determining whether at least one attribute of the packetized digitally rendered content meets a prescribed criterion with respect to a first multicast stream.

4. The computerized method of claim 3, wherein the determining whether the at least one attribute of the packetized digitally rendered content meets the prescribed criterion with respect to the first multicast stream comprises: (i) evaluating the first multicast stream, the evaluating comprising identifying a transport protocol utilized by the first multicast stream, and (ii) determining whether the identified transport protocol is appropriate for delivery of the packetized digitally rendered content to the computerized client device.

5. The computerized method of claim 3, wherein the determining whether the at least one attribute of the packetized digitally rendered content meets the prescribed criterion with respect to the first multicast stream comprises: (i) evaluating the first multicast stream, the evaluating comprising identifying at least one URL (universal resource locator) utilized by the first multicast stream, and (ii) determining whether the identified at least one URL is among a data structure of URLs.

6. The computerized method of claim 3, wherein the determining whether the at least one attribute of the packetized digitally rendered content meets the prescribed criterion with respect to the first multicast stream comprises: (i) evaluating the first multicast stream, the evaluating comprising identifying at least one URL (universal resource locator) utilized by the first multicast stream, and (ii) determining whether the identified at least one URL is associated with a server process associated with a prescribed bitrate or quality.

7. Computerized network apparatus comprising:

first data interface apparatus, the first data interface apparatus configured to receive a plurality of transport streams (TS) each comprising a plurality of packetized content from a network;

second data interface apparatus, the second data interface apparatus configured to communicate with a plurality of computerized client devices within the network; and digital processor apparatus, the digital processor apparatus in data communication with the first data interface apparatus and the second data interface apparatus and configured to execute at least one computer program thereon, the at least one computer program comprising a plurality of instructions, the plurality of instructions configured to, when executed by the digital processor apparatus, cause the computerized network apparatus to:

receive data representative of a request for packetized digitally rendered content, the request originated from a first one of the plurality of computerized client devices;

utilize at least the data representative of the request to determine whether to provide the requested packetized digitally rendered content to the first one of the plurality of computerized client devices as at least one of: a new unicast stream thereto, or multicast stream switched into one of the plurality of TS delivered to the computerized network apparatus as an updated TS;

based on a determination that the requested packetized digitally rendered content will be provided to the first one of the plurality of computerized client devices as the multicast stream switched into the one of the plurality of TS delivered to the computerized network apparatus as the updated TS, cause the first one of the plurality of computerized client devices to join the multicast stream via receipt of the updated TS;

identify and re-format the requested packetized digitally rendered content from the updated TS into a format capable of being utilized by the first one of the plurality of computerized client devices; and cause delivery, via the multicast stream, of the requested packetized digitally rendered content to the first one of the plurality of computerized client devices.

8. The computerized network apparatus of claim 7, wherein the network comprises a managed cable service provider network having a substantially static topology.

9. The computerized network apparatus of claim 7, wherein the plurality of instructions configured to, when executed by the digital processor apparatus, cause the computerized network apparatus to:

cause a switch to a stream of at least one of higher bitrate or quality when resources associated with the first one of the plurality of computerized client devices, or the network associated thereto, improve.

10. The computerized network apparatus of claim 7, wherein the plurality of instructions configured to, when executed by the digital processor apparatus, cause the computerized network apparatus to:

cause a switch to a stream of at least one of lower bitrate or quality when resources associated with the first one of the plurality of computerized client devices, or the network associated thereto, deteriorate.

11. The computerized network apparatus of claim 7, wherein the determination of whether to provide the requested packetized digitally rendered content to the first one of the plurality of computerized client devices as at least one of: the new unicast stream thereto, or the multicast stream switched into the one of the plurality of TS delivered to the computerized network apparatus as the updated TS, is based at least in part on data relating to one or more historical patterns with respect to use of at least one of (i) the requested packetized digitally rendered content, or (ii) a source associated therewith.

12. The computerized network apparatus of claim 7, wherein the determination of whether to provide the requested packetized digitally rendered content to the first one of the plurality of computerized client devices as at least one of: the new unicast stream thereto, or the multicast stream switched into the one of the plurality of TS delivered to the computerized network apparatus as the updated TS, is based at least in part on a then-current number of requests for the requested digitally rendered content in a service group to which the multicast stream switched into the one of the plurality of TS is provided.

13. Computer readable apparatus comprising a non-transitory storage medium, the non-transitory storage medium comprising at least one computer program having a plurality of instructions, the plurality of instructions configured to, when executed on a digital processing apparatus, cause a computerized apparatus to:

receive data representative of a request from a computerized client device in data communication with a network, the data representative of the request indicating particular digitally rendered content, the digitally rendered content packetized using at least an Internet Protocol (IP);

determine whether an appropriate multicast stream comprising the packetized digitally rendered content exists;

based at least on the determination indicating that the appropriate multicast stream comprising the requested packetized digitally rendered content does not exist:

create a new multicast stream for delivery of the requested packetized digitally rendered content to the computerized client device via a new multi-program transport stream (MPTS);

cause the computerized client device to join the new multicast stream via receipt of the new MPTS; and identify and re-format the requested packetized digitally rendered content from the new MPTS into a format capable of being utilized by the computerized client device; and cause delivery, over the network and via the new MPTS, of the packetized digitally rendered content to the computerized client device.

14. The computer readable apparatus of claim 13, wherein the creation of the new multicast stream is at least partly based on a determination that a destination Internet Protocol (IP) address associated with the packetized digitally rendered content comprises an IP address associated with a known third-party data server in data communication with the network.

15. The computer readable apparatus of claim 13, wherein the determination of whether the appropriate multicast stream comprising the packetized digitally rendered content exists comprises determining whether at least one attribute of the packetized digitally rendered content meets a prescribed criterion with respect to a first multicast stream.

16. The computer readable apparatus of claim 15, wherein the determination of whether the at least one attribute of the packetized digitally rendered content meets the prescribed criterion with respect to the first multicast stream comprises: (i) an evaluation of the first multicast stream, the evaluation comprising identifying a transport protocol utilized by the first multicast stream, and (ii) a determination of whether the identified transport protocol is appropriate for delivery of the packetized digitally rendered content to the computerized client device.

17. The computer readable apparatus of claim 15, wherein the determination of whether the at least one attribute of the packetized digitally rendered content meets the prescribed criterion with respect to the first multicast stream comprises: (i) an evaluation the first multicast stream, the evaluation comprising an identification of at least one URL (universal resource locator) utilized by the first multicast stream, and (ii) a determination whether the identified at least one URL is among a data structure of URLs.

18. The computer readable apparatus of claim 15, wherein the determination of whether the at least one attribute of the packetized digitally rendered content meets the prescribed criterion with respect to the first multicast stream comprises: (i) an evaluation of the first multicast stream, the evaluation comprising an identification of at least one URL (universal resource locator) utilized by the first multicast stream, and (ii) a determination whether the identified at least one URL is associated with a server process associated with a prescribed bitrate or quality.

19. The computer readable apparatus of claim 13, wherein the network comprises a managed cable service provider network having a substantially static topology.

20. The computer readable apparatus of claim 13, wherein the causation of the delivery, over the network and via the new MPTS, of the packetized digitally rendered content to the computerized client device comprises causation of delivery of the packetized digitally rendered content in an advanced video encoding format over Data Over Cable Service Interface Specification (DOCSIS) to an IP-enabled client device.

* * * * *